(12) United States Patent
Taguchi et al.

(10) Patent No.: US 11,709,310 B2
(45) Date of Patent: Jul. 25, 2023

(54) SURFACE-EMITTING LIGHT SOURCE AND METHOD OF MANUFACTURING THE SAME

(71) Applicant: NICHIA CORPORATION, Anan (JP)

(72) Inventors: Koji Taguchi, Anan (JP); Masaaki Katsumata, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/449,200

(22) Filed: Sep. 28, 2021

(65) Prior Publication Data

US 2022/0099883 A1 Mar. 31, 2022

(30) Foreign Application Priority Data

Sep. 29, 2020 (JP) .................................. 2020-164134
Apr. 7, 2021 (JP) .................................. 2021-065473

(51) Int. Cl.
*F21V 8/00* (2006.01)

(52) U.S. Cl.
CPC ......... *G02B 6/0083* (2013.01); *G02B 6/0021* (2013.01); *G02B 6/0031* (2013.01); *G02B 6/0068* (2013.01)

(58) Field of Classification Search
CPC .. G02B 6/0083; G02B 6/0021; G02B 6/0031; G02B 6/0068
See application file for complete search history.

(56) References Cited

U.S. PATENT DOCUMENTS

| | | | | |
|---|---|---|---|---|
| 2008/0284315 A1* | 11/2008 | Tasumi | ................ | H01L 33/501 313/503 |
| 2009/0201699 A1* | 8/2009 | Ohno | .................. | H05K 1/0206 362/634 |
| 2009/0273931 A1* | 11/2009 | Ito | .......................... | G02B 6/002 362/267 |
| 2011/0305003 A1 | 12/2011 | Lee et al. | | |
| 2012/0014092 A1 | 1/2012 | Lee et al. | | |
| 2014/0368768 A1 | 12/2014 | Sakai | | |

(Continued)

FOREIGN PATENT DOCUMENTS

| | | |
|---|---|---|
| JP | 2004006081 A | 1/2004 |
| JP | 2006237232 A | 9/2006 |

(Continued)

*Primary Examiner* — Mary Ellen Bowman
(74) *Attorney, Agent, or Firm* — Hunton Andrews Kurth LLP

(57) ABSTRACT

A surface-emitting light source includes: a wiring substrate including a wiring layer on a base member; a light-guiding plate having a first primary surface and a second primary surface facing the wiring substrate; a light-reflective resin portion having an opening and being disposed between the light-guiding plate and the wiring substrate; and a light source portion including an element electrode on a first surface thereof and a light-extracting surface on a second surface thereof that faces the light-guiding place. The element electrode is electrically connected to the wiring layer via the opening, which is equal to or smaller than an area in which a side surface of the light source portion contacts the resin portion. The resin portion and the light-guiding plate face each other and are bonded to each other, and the resin portion and the wiring substrate face each other and are bonded to each other.

23 Claims, 25 Drawing Sheets

(56) References Cited

U.S. PATENT DOCUMENTS

| | | | |
|---|---|---|---|
| 2016/0091760 A1 | 3/2016 | Ogura et al. | |
| 2016/0238895 A1 | 8/2016 | Choi et al. | |
| 2018/0080625 A1 | 3/2018 | Yamada et al. | |
| 2019/0025498 A1 | 1/2019 | Kaneki et al. | |
| 2019/0094618 A1 | 3/2019 | Kyoukane et al. | |
| 2019/0275925 A1 | 9/2019 | Chen et al. | |
| 2019/0285945 A1 | 9/2019 | Kyoukane et al. | |
| 2019/0310516 A1 | 10/2019 | Kyoukane et al. | |
| 2020/0044121 A1 | 2/2020 | Imada et al. | |
| 2020/0049877 A1 | 2/2020 | Watanabe et al. | |
| 2020/0176650 A1 | 6/2020 | Achi et al. | |
| 2020/0209458 A1 | 7/2020 | Yuu | |
| 2020/0209460 A1* | 7/2020 | Achi | F21V 5/04 |
| 2020/0209462 A1 | 7/2020 | Kasai | |
| 2021/0382354 A1* | 12/2021 | Shinomiya | G02B 6/0083 |

FOREIGN PATENT DOCUMENTS

| | | | |
|---|---|---|---|
| JP | 2012003263 A | 1/2012 | |
| JP | 2012043793 A | 3/2012 | |
| JP | 2013143240 A | 7/2013 | |
| JP | 2014072075 A | 4/2014 | |
| JP | 2014072076 A | 4/2014 | |
| JP | 2015194636 A | 11/2015 | |
| JP | 2016066598 A | 4/2016 | |
| JP | 2016149356 A | 8/2016 | |
| JP | 2018045972 A | 3/2018 | |
| JP | 2018081250 A | 5/2018 | |
| JP | 2018101521 A | 6/2018 | |
| JP | 2018181630 A | 11/2018 | |
| JP | 2018207005 A | 12/2018 | |
| JP | 2019023993 A | 2/2019 | |
| JP | 2019061929 A | 4/2019 | |
| JP | 2019129000 A | 8/2019 | |
| JP | 2019160688 A | 9/2019 | |
| JP | 2019160770 A | 9/2019 | |
| JP | 2019185921 A | 10/2019 | |
| JP | 2020021899 A | 2/2020 | |
| JP | 2020087889 A | 6/2020 | |
| JP | 2020107584 A | 7/2020 | |
| JP | 2020109718 A | 7/2020 | |
| JP | 2020109745 A | 7/2020 | |
| WO | 2008087883 A1 | 7/2008 | |
| WO | 2012141094 A1 | 10/2012 | |
| WO | 2017199642 A1 | 11/2017 | |

* cited by examiner

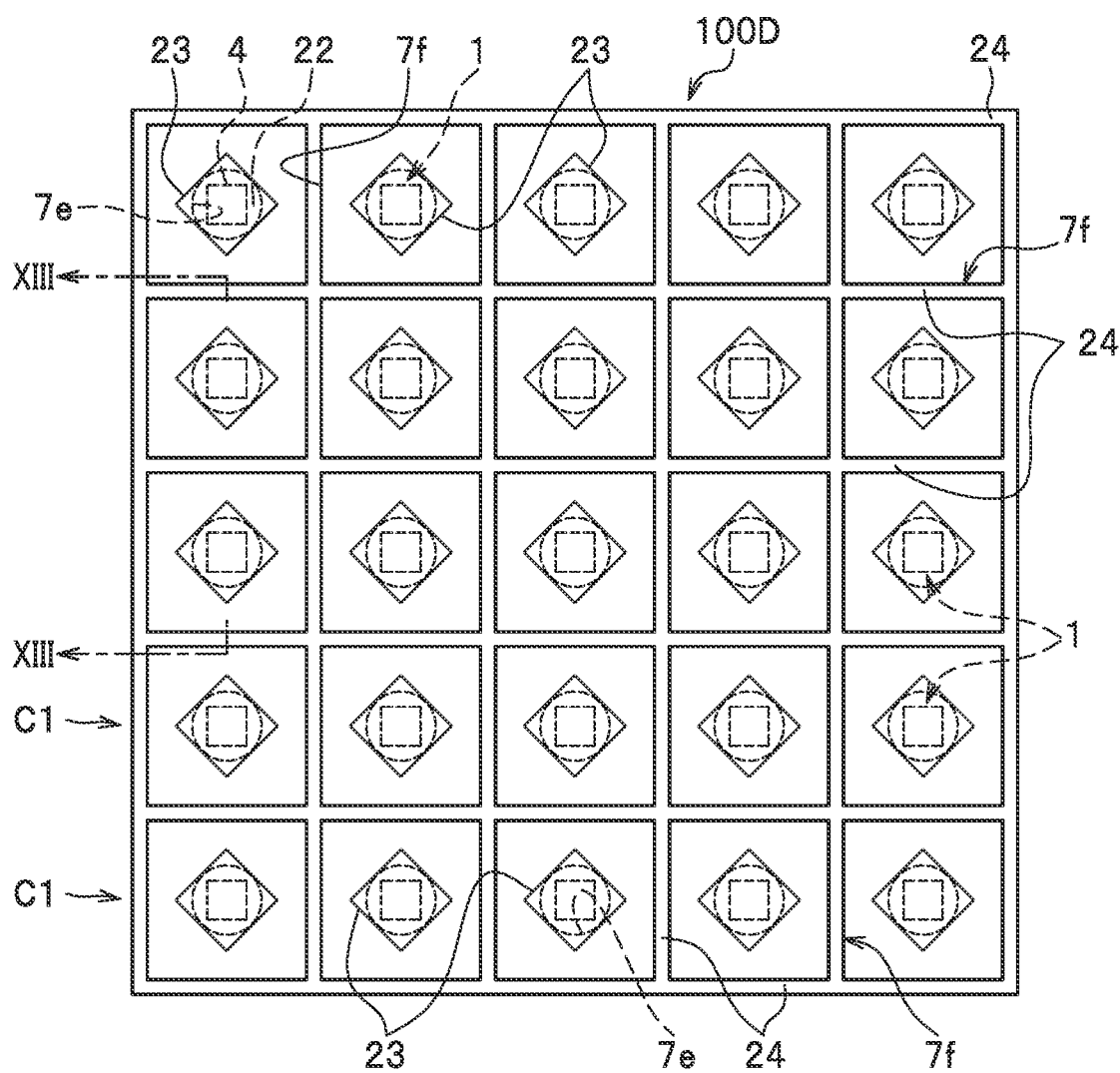

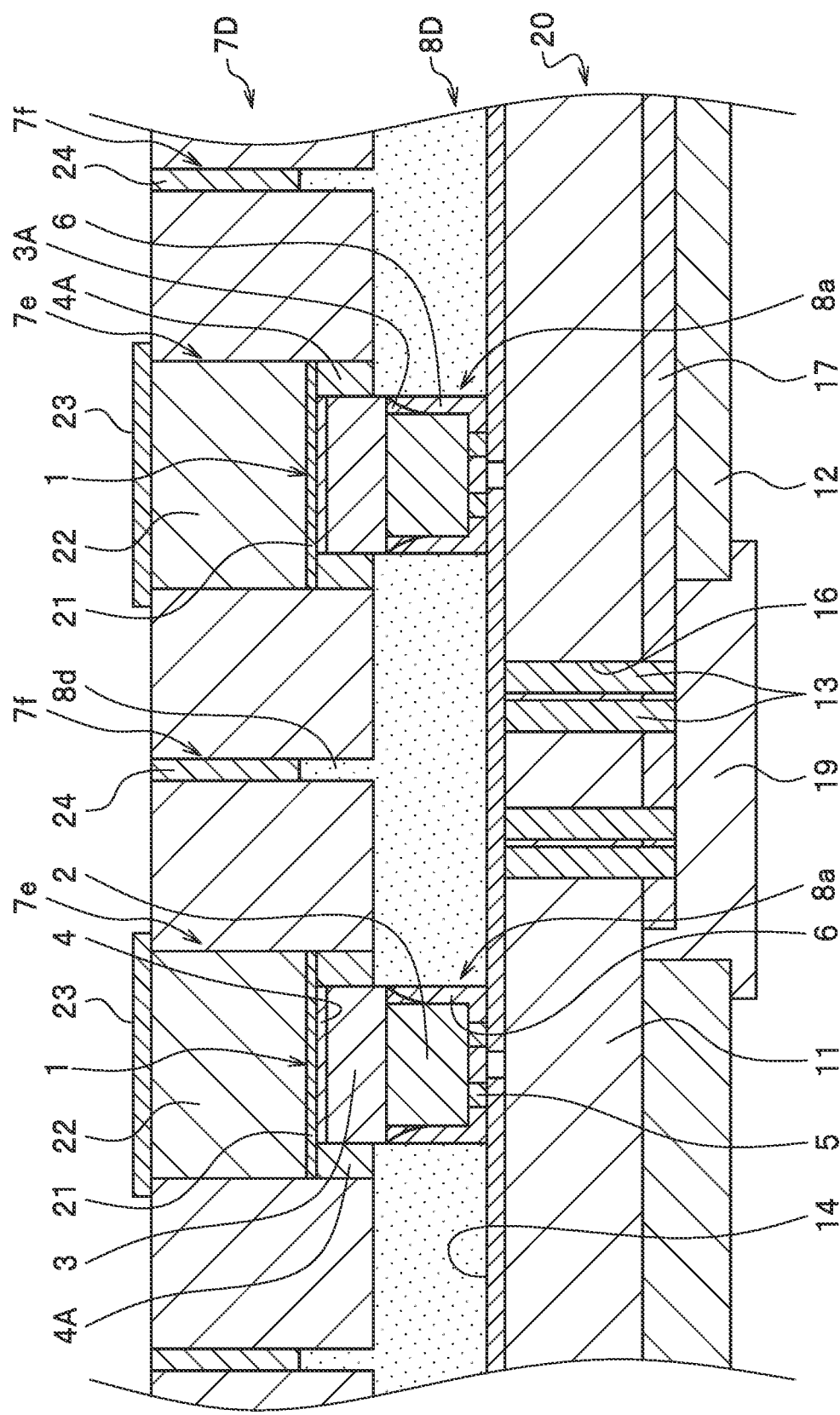

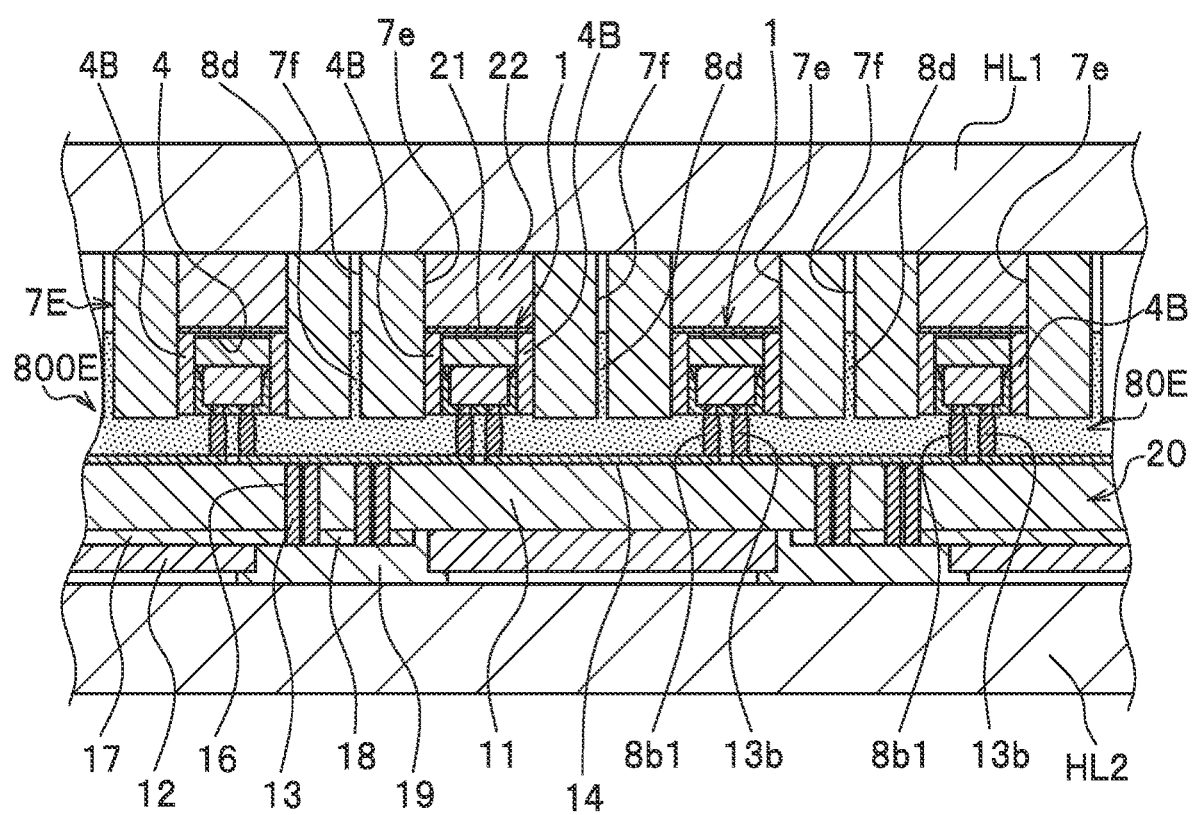

SURFACE-EMITTING LIGHT SOURCE AND METHOD OF MANUFACTURING THE SAME

CROSS-REFERENCE TO RELATED APPLICATIONS

This application is based upon and claims the benefit of priority from Japanese Patent Application No. JP2020-164134 filed on Sep. 29, 2020, and Japanese Patent Application No. JP2021-065473 filed on Apr. 7, 2021, the entire contents of which are incorporated herein by reference.

The present disclosure relates to a surface-emitting light source and a method of manufacturing the same.

BACKGROUND

A conventional illumination device employing a surface-emitting light source includes a reflecting sheet which has a plurality of openings and is disposed on a substrate, and a plurality of light-emitting elements which correspond in position to the plurality of openings, respectively (refer to Japanese Patent Application Publication JP2019-160688). The illumination device includes a diffusing plate disposed at a position spaced apart from the reflecting sheet, and extracts light from the light-emitting element and the reflecting sheet to the outside via the diffusing plate.

SUMMARY OF EXEMPLARY EMBODIMENTS OF THE PRESENT DISCLOSURE

A surface-emitting light source according to an embodiment of the present disclosure includes: a wiring substrate including a wiring layer on a base member; a light-guiding plate having a first primary surface and a second primary surface that is opposite to the first primary surface and faces the wiring substrate; a resin portion having a light-reflectivity having an opening and disposed between the light-guiding plate and the wiring substrate; and a light source portion having a first surface and a second surface opposite to each other and including an element electrode on the first surface and a light-extracting surface on the second surface. In the light source portion, the element electrode and the wiring layer are connected to each other via the opening of the resin portion, the light source portion has a side surface having an area that contacts the resin portion, the opening may have a size equal to or smaller than the area, the light-extracting surface of the light source portion is provided to face the light-guiding plate, the resin portion and the light-guiding plate face each other and are bonded to each other, and the resin portion and the wiring substrate face each other and are bonded to each other. Further, a surface-emitting light source according to an embodiment of the present disclosure includes: a wiring substrate including a wiring layer on a base member; a light-guiding plate having a first primary surface and a second primary surface that is opposite to the first primary surface, faces the wiring substrate and includes a recess portion or a through hole; a resin portion having a light-reflectivity filled in the recess portion or the through hole and disposed between the light-guiding plate and the wiring substrate; a light source portion having a first surface and a second surface opposite to each other and including an element electrode on the first surface and a light-extracting surface on the second surface; and a conductive member electrically connecting the element electrode and the wiring layer. The resin portion contacts the light source portion or the conductive member, the resin portion and the light-guiding plate face each other and are bonded to each other, and the resin portion and the wiring substrate face each other and are bonded to each other.

A method of manufacturing a surface-emitting light source according to an embodiment of the present disclosure includes: preparing: a wiring substrate including a light source portion electrically connected to a wiring layer; a light-guiding plate having a first primary surface and a second primary surface that is opposite to the first primary surface and includes a recess portion or a through hole; and a resin sheet having a light-reflectivity and including an opening having a size equal to or larger than the light source portion; and bonding: the wiring substrate and the resin sheet to each other by bringing the resin sheet into contact with the wiring substrate and the light-guiding plate into contact with the resin sheet and heating the resin sheet to melt a portion of the resin sheet while a light-extracting surface of the light source portion is exposed from the resin sheet via the opening of the resin sheet; and further bonding the resin sheet and the light-guiding plate to each other after a melted portion of the resin sheet enters the recess portion or the through hole. Note that, "contact" means that the wiring substrate and the resin sheet or the light-guiding plate and resin sheet are contacted to each other.

A method of manufacturing a surface-emitting light source according to an embodiment of the present disclosure includes: preparing: an intermediate electrically connecting an element electrode of a light source portion to a wiring layer of a wiring substrate via an opening of a resin sheet in contact with the wiring substrate; and a light-guiding plate having a first primary surface and second primary surface opposite to each other and including a recess portion or a through hole; and bonding: the wiring substrate and the resin sheet to each other by bringing the resin sheet into contact with the wiring substrate and heating the resin sheet to melt a portion of the resin sheet; and further bonding the resin sheet and the light-guiding plate to each other after a melted portion of the resin sheet enters the recess portion or the through hole.

BRIEF DESCRIPTION OF THE DRAWINGS

A more complete appreciation of embodiments of the present disclosure and many of the attendant advantages thereof will be readily obtained by reference to the following detailed description when considered in connection with the accompanying drawings.

FIG. 12 is a plan view illustrating a surface-emitting light source according to a third embodiment of the present disclosure.

FIG. 13 is a cross-sectional view taken along XIII-XIII in FIG. 12.

FIG. 16F is a cross-sectional view illustrating a process of bonding in the method of manufacturing the surface-emitting light source according to the fourth embodiment.

DESCRIPTION OF EXEMPLARY EMBODIMENTS

Figure 1:
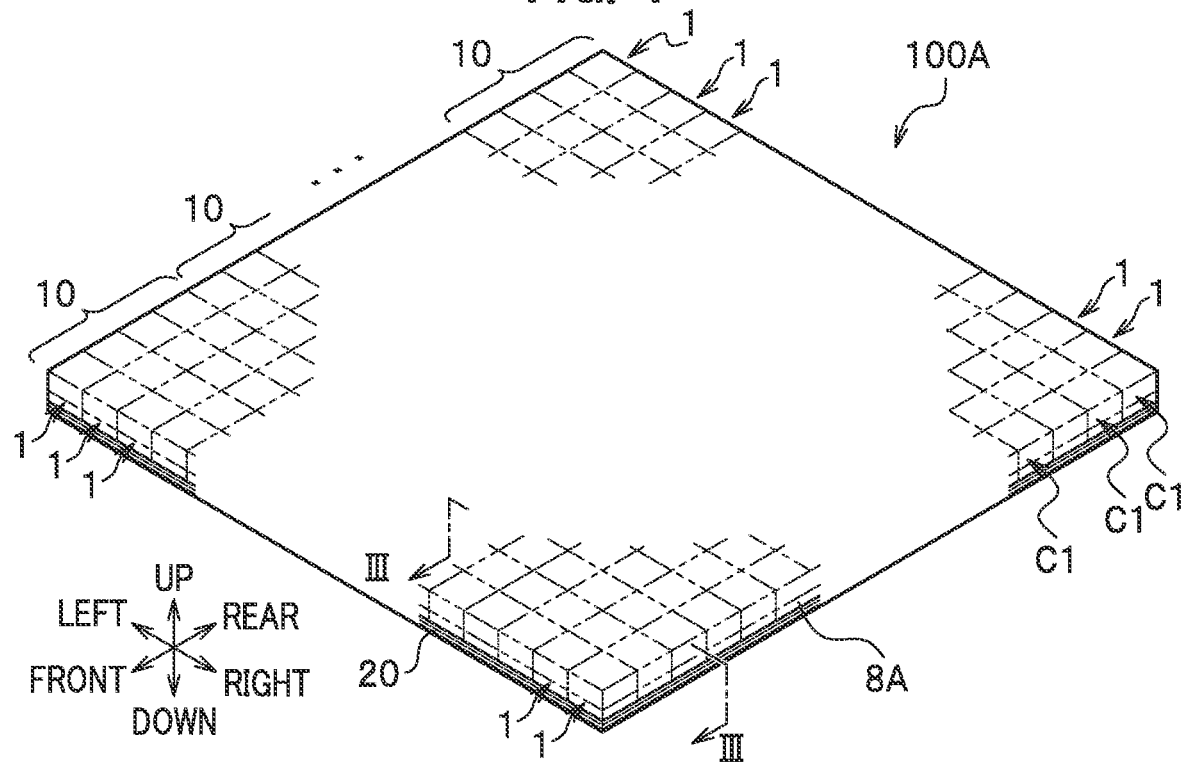
FIG. 1 is a perspective view schematically illustrating a surface-emitting light source according to a first embodiment of the present disclosure, in which a part of thereof is omitted.

In the conventional illumination device, the reflecting sheet and the diffusing plate are provided spaced apart from each other, and the illumination device tends to be larger in size. The openings of the reflecting sheet are formed to have clearances between edges of the openings and those of the light-emitting elements. Thus, light can travel toward a substrate and can be absorbed by wirings of the substrate.

Embodiments herein provide a surface-emitting light source and a method of manufacturing the same having a smaller thickness and lower light absorption by the wirings of the substrate.

The drawings referred to in the descriptions according to certain embodiments below schematically illustrate the present disclosure. Scales, distances, positional relationships of members can be exaggerated, or illustration of some members can be omitted. Scales of members and distances between members are not necessarily the same. In the descriptions below, the same terms or reference numerals generally represent the same or the homogeneous member, and detailed descriptions can be appropriately omitted. In a configuration of a wiring substrate, terms such as "upper", "lower", "left", and "right" are interchangeable in accordance with the circumstances. In the present specification, the terms such as "upper" and "lower" are intended to represent a relative position between the components in the drawing referred to for description but are not intended to represent an absolute position unless specifically stated otherwise.

First Embodiment

Figure 2:
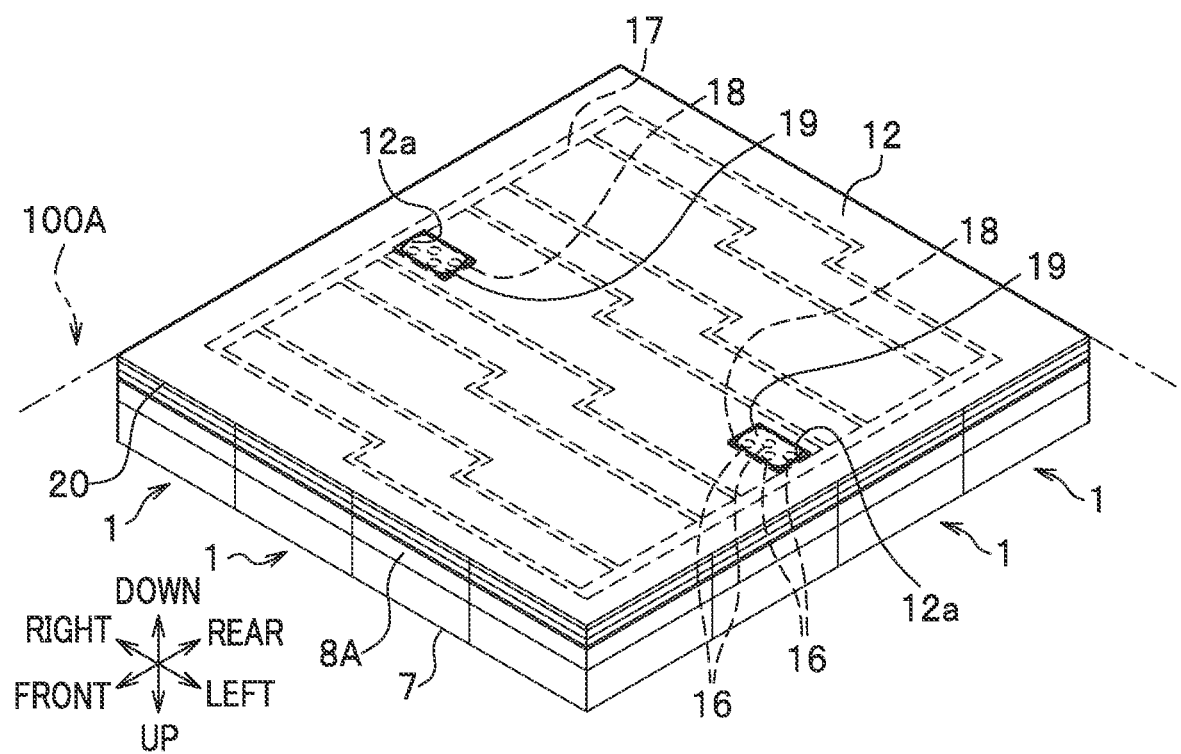
FIG. 2 is a perspective view schematically illustrating a part of the surface-emitting light source according to the first embodiment as viewed from a wiring substrate.
Figure 3:
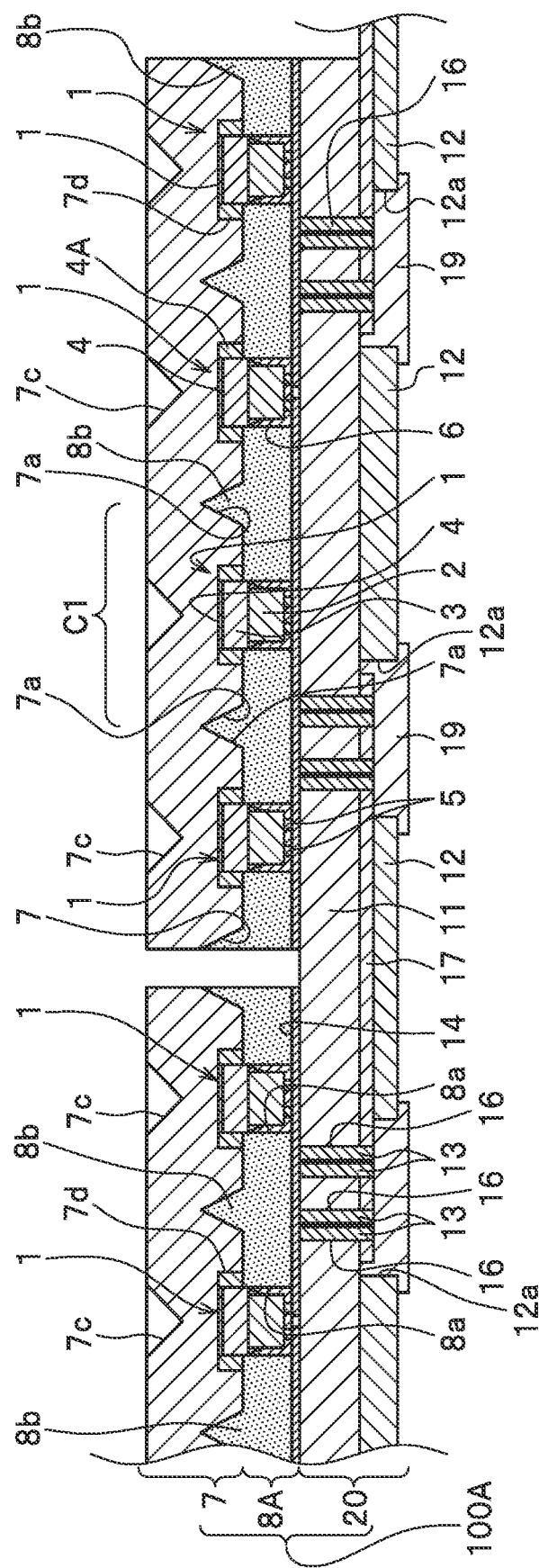
FIG. 3 is a schematic cross-sectional view taken along III-III of the surface-emitting light source of FIG. 1.
Figure 4:
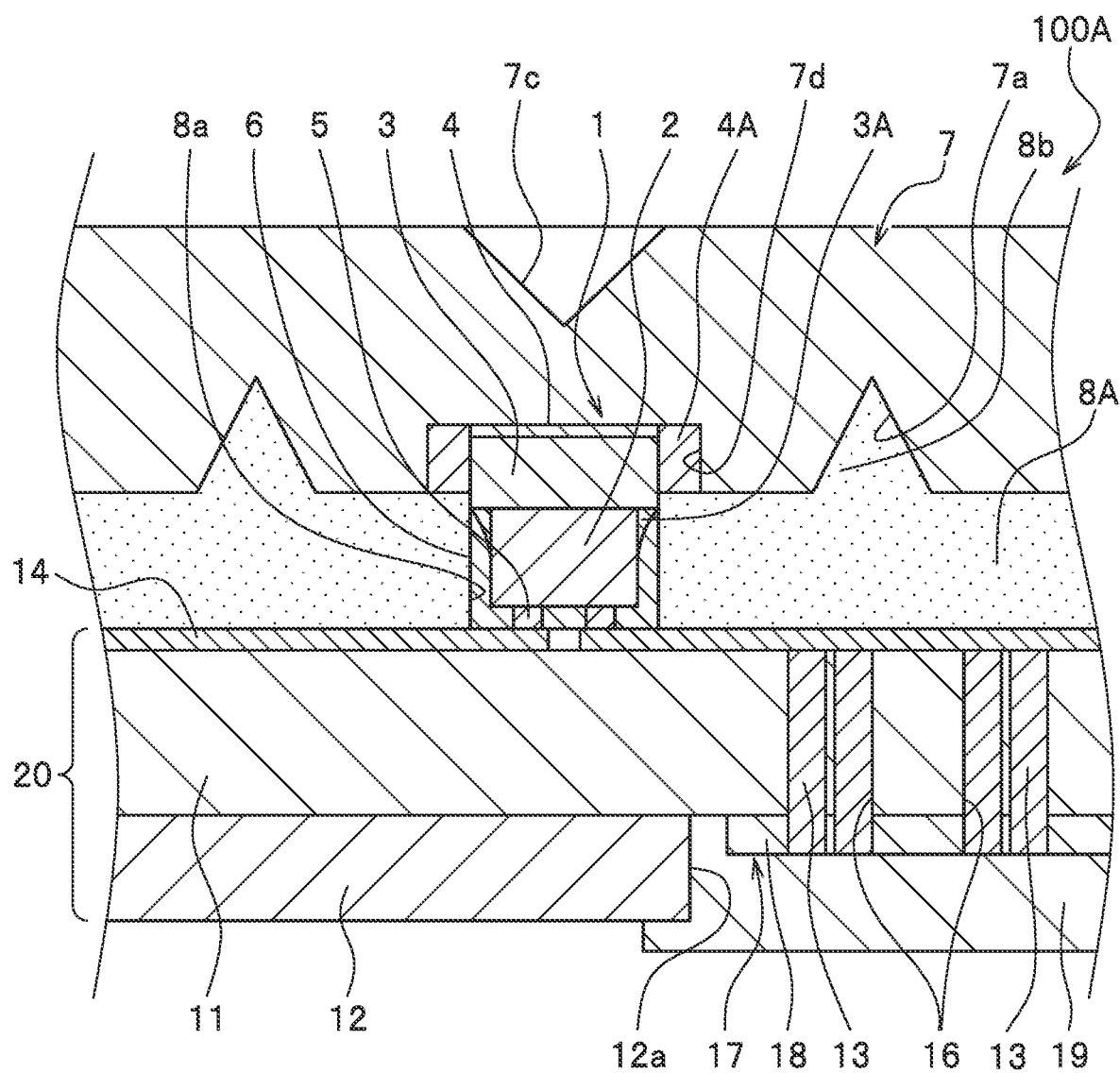
FIG. 4 is an enlarged cross-sectional view schematically illustrating a cell of the surface-emitting light source of FIG. 3.
Figure 5:
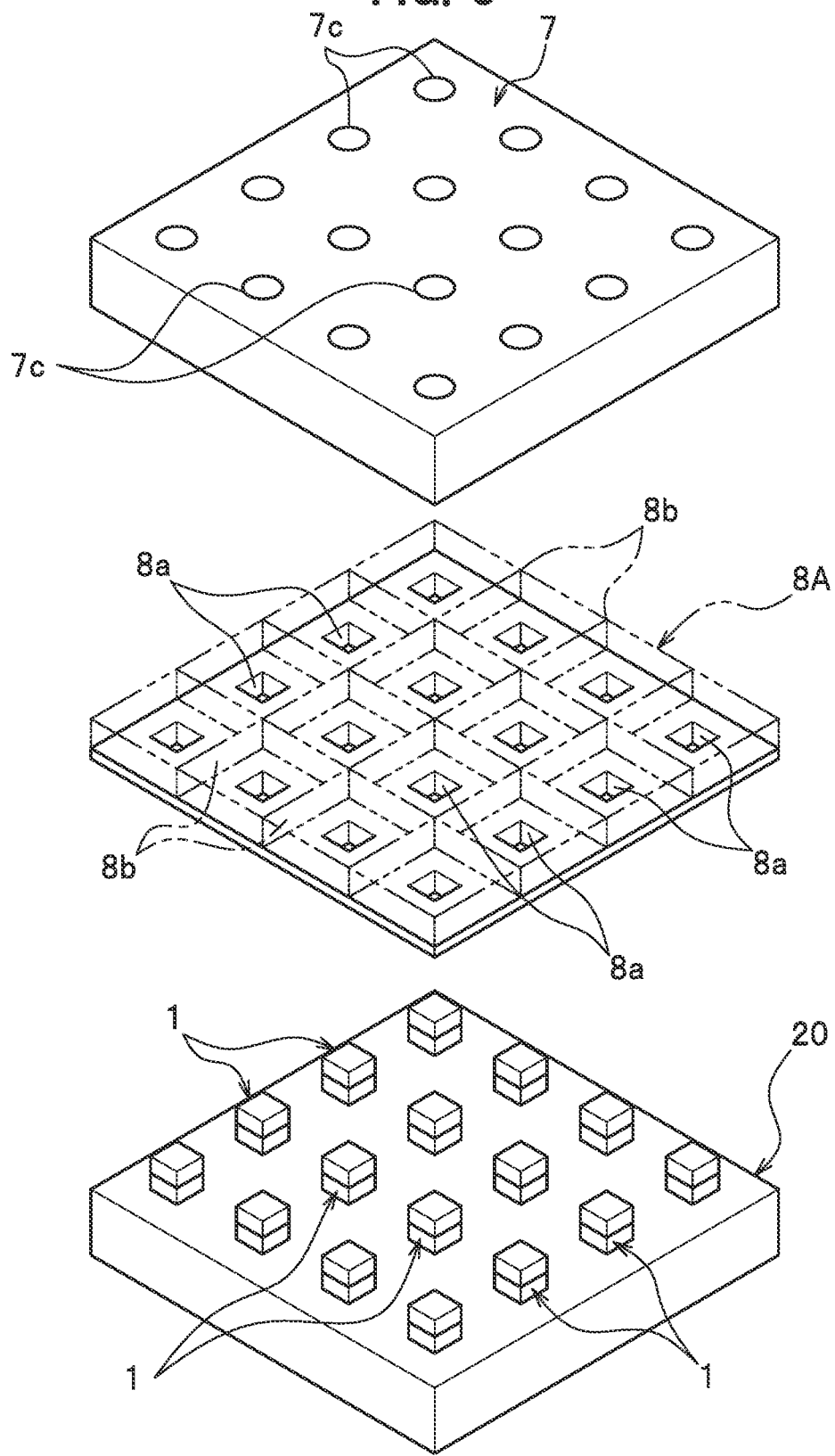
FIG. 5 is an exploded perspective view schematically illustrating the surface-emitting light source in which a light-guiding plate, a resin portion and the wiring substrate are separated from each other.

FIG. 1 is a perspective view schematically illustrating a surface-emitting light source according to a first embodiment, in which a part of thereof is omitted. FIG. 2 is a perspective view schematically illustrating a part of the surface-emitting light source according to the first embodiment as viewed from a wiring substrate. FIG. 3 is a schematic cross-sectional view taken along III-III of the surface-emitting light source of FIG. 1. FIG. 4 is an enlarged cross-sectional view schematically illustrating a cell of the surface-emitting light source of FIG. 3. FIG. 5 is an exploded perspective view schematically illustrating the surface-emitting light source in which a light-guiding plate, a resin portion and the wiring substrate are separated from each other. FIGS. 1 and 2 illustrate a cell C1 of the surface-emitting light source 100A with two-dot chain line or solid line as a border of each cell. These lines are described as an indication of a cell area but do not really exist. In the surface-emitting light source 100A, for example, an object in which a portion of a resin sheet used in a method of manufacturing is cured after the resin sheet is melted will be described as a resin portion 8A.

Surface-Emitting Light Source

A surface-emitting light source 100A includes: the wiring substrate 20 having a first wiring layer 17 on a base member 11; a light-guiding plate 7 disposed to face the wiring substrate 20; a light-reflective resin portion 8A disposed between the light-guiding plate 7 and the wiring substrate 20; and a light source portion 1 having element electrodes 5 on a first surface and having a light-extracting surface on a second surface opposite to the first surface. The light source portion 1 is provided via an opening 8a, which is formed in the resin portion 8A, having an area equal to or smaller than an area surrounding a side of the light source portion 1. The element electrodes 5 of the light source portion 1 are electrically connected to a second wiring layer 14 via the opening 8a of the resin portion 8A. The light-extracting surface of the light source portion 1 is provided to face the light-guiding plate 7. In the surface-emitting light source 100A, the resin portion 8A and the light-guiding plate 7 have portions respectively which face each other and are bonded to each other, and the resin sheet 8A and the wiring substrate 20 have portions respectively which face each other and are bonded to each other. The light source portion 1 having a light-emitting element 2 includes, for example, a first light-transmissive member 3 disposed on a first light-extracting surface of the light-emitting element 2 and a covering member 6 (a white resin) provided directly or indirectly on the side surface of the light-emitting element 2. In the light source portion 1, a light-reflective film 4 is disposed on the first light-transmissive member 3 via a second light-transmissive member having adhesion. The element electrodes 5 are electrically connected to the first wiring layer 17 via a conductive member 13 connected to the second wiring layer 14. Hereinafter, each member of the surface-emitting light source 100A will be described.

Wiring Substrate

The wiring substrate 20 includes a first covering layer 12 covering the first wiring layer 17. The first covering layer 12 has a wiring opening portion 12a through which the element electrodes 5 are electrically connected to the external. In detail, the wiring substrate 20 includes: on one side of a base member 11, the first wiring layer 17; a wiring pad 18 being connected to the first wiring layer 17 and having a plurality of vias 16; conductive members 13 filled in the vias 16; a protection member 19 protecting the conductive members 13; and the first covering layer 12 covering the first wiring layer 17. In the wiring substrate 20, the second wiring layer 14 is formed on the other side of the base member 11. In the wiring substrate 20, the resin member 8A is disposed on the other side of the base member 11, and the electrodes 5 of the light source portion 1 are electrically connected to the second wiring layer 14 via the opening 8a formed in the resin portion 8A.

The base member 11 formed in the wiring substrate 20 is made of an insulative resin such as a phenol resin, an epoxy resin, a polyamide resin, a polyethylene terephthalate, a polyethylene naphthalate, a silicon resin, a BT resin, or a polyphthalamide. The base member 11 can have a configuration in which layered insulative members are formed on the surface of a metal member. The base member 11 can employ a rigid board or a flexible board or can be layered base members.

The first wiring layer 17 and the second wiring layer 14 are wired with a prescribed circuit pattern on the one side or the other side of the base member 11, respectively. The first wiring layer 17 includes a pair of rectangular wiring pads 18 and a narrow wiring continuous with the wiring pads 18. The pair of wiring pads 18 is formed on, for example, every 16 cells when a unit with one light source portion 1 represents a cell C1 (see FIG. 1). The first wiring layer 17 and the second wiring layer 14 can employ a metal. The wiring pad 18 has the via 16 or can have two or more vias 16. An example of an opening shape of the via 16 is a circle or an oval, but not limited thereto.

The conductive members 13 filled in the vias 16 are electrically conductive to supply current from an external power source to the light source portions 1 aligned. The conductive members 13 here are filled in two vias 16 respectively and extend between them. The conductive members 13, for example, can employ a mixture including a filler such as flake, scale or bark-like silver powder or copper powder; and a binder resin having a thermosetting property. The protection member 19 protects the wiring pad 18 and the conductive members 13. The protection member 19 can employ materials such as a phenyl silicon resin and a dimethyl silicon resin, also can include a pigment to make the protection member being non light-transmittivity. The covering layer 12 is formed to cover a prescribed range with a prescribed thickness to protect the wiring substrate 20 and the first wiring layer 17. The first covering layer 12 can be formed of the same resin as the protection member 19 or a polyamide resin as a base material. The first covering layer 12 includes a wiring opening portion 12a. The wiring opening portion 12a can have an area larger than that of the wiring pad 18 or smaller than that of the wiring pad 18 such that a part of the first covering layer 12 covers the periphery of the wiring pad 18.

Resin Portion

As illustrated in FIG. 4, the resin portion 8A is formed as a resin sheet (a plate) which is preliminarily formed and has the opening 8a in which the light source portion 1 is to be inserted and disposed. The resin portion 8A has an average thickness which is substantially equal to that of the light-emitting element 2 of the light source portion 1 or larger than a height of the light-emitting element 2. Meanwhile, the average height of the resin portion 8A is smaller than that of an upper surface of the first light-transmissive member 3. The opening 8a of the resin portion 8A is open (or extends through) in a thickness direction and is formed with an appropriate size to contact a side surface of the light source portion 1 without any gap. The resin portion 8A has no clearance between the opening 8a and the side surface of the light source portion 1, thereby preventing a light from being absorbed by the second wiring layer 14. The resin portion 8A has a first convex portion 8b which is formed in a first recess portion 7a of the light-guiding plate 7 along its inner shape. The first convex portion 8b here has a triangular shape in a cross-sectional view along the first recess portion 7a and surrounds rectangularly the light source portion 1 in a plan view.

The resin portion 8A can have a reflectance of 60% or more or 90% or more from the light-emitting element 2 as a light-reflectivity. The resin portion 8A can have a resin containing a white pigment. The resin portion 8A is used with relatively large quantities to cover the whole surface of the light-guiding plate 7 and can employ a thermoplastic resin containing an inexpensive titanium oxide. As an example, the resin portion 8A is made of a material such that a portion of a resin sheet is melted by heating the resin sheet during the bonding and the melted portion is used as an adhesive layer to bond the light-guiding plate 7 and the wiring substrate 20. Accordingly, the resin portion 8A can be a thermoplastic resin, for example, a polyethylene, a polypropylene, a polyvinyl chloride, a polystyrene, a polyvinyl acetate, an ABS resin, an AS resin or an acrylic resin. The first convex portion 8b of the resin portion 8A is formed from the resin sheet in a bonding process during the manufacture, as described later. The perspective view in FIG. 5 illustrates the completed surface-emitting light source 100A exploded and the first convex portion 8b is indicated by a two-dot chain line.

Light Source, Light-Emitting Element

As illustrated in FIG. 4, the light source portion 1 includes, for example, the light-emitting element 2; the first light-transmissive member 3 disposed on the light-extracting surface of the light-emitting element 2; a light-transmissive adhesive member 3A provided between the light-extracting surface of the light-emitting element 2 and the first light-transmissive member 3 and on a side surface of the light-emitting element 2 (see FIG. 4); the covering member 6 (the white resin: a light-transmissive member) directly or indirectly provided on the side surface of the light-emitting element 2; and the light-reflective film 4 disposed on the first light-transmissive member 3. In the light source portion 1, the element electrode 5 of the light-emitting element 2 is electrically connected to the second wiring layer 14 of the wiring substrate 20 formed opposite to the light-guiding plate 7. When components of a single light source portion 1 are defined as the cell C1 (see FIGS. 1 and 2), the plural cells are aligned adjacent to each other in longitudinal and lateral directions and formed as a light-emitting module 10. The light-emitting module 10 are formed of, for example, 16 cells (per one unit) or four cells multiplied by four cells. In the surface-emitting light source 100A, for example, the light-emitting module 10 is formed by arrangement of 76 units.

The light-emitting element 2 can employ a conventional semiconductor light-emitting element such as a light-emitting diode. The light-emitting element 2 employs a plurality of light-emitting elements to emit a blue light or a different colored light and is allowed to emit a white light by mixing respective colored lights of, for example, a red, blue and green. For the light-emitting element 2, an element to emit a desired wavelength can be selected, and a configuration, an emission color, a size and a number of a light-emitting element can be appropriately selected according to the purpose. An example of an element emitting a blue or a green light is a nitride-based semiconductor ($In_xAl_yGa_{1-x-y}N$, $0 \leq X$, $0 \leq Y$, $X+Y \leq 1$), or a light-emitting element employing GaP. An example of an element to emit a red light is a light-emitting element including a semiconductor such as GaAlAs or AlInGaP. A semiconductor light-emitting element made of a material aside from above can be employed and any wavelengths can be selected according to a material used for a semiconductor layer or crystal mixing ratio thereof. The element electrodes 5 of the light-emitting element 2 is formed opposite to the first light-transmissive member 3 and exposed from the lower surface of the covering member 6. The element electrodes 5 have a negative electrode and a positive electrode which are placed apart from each other or can be placed on a diagonal line or along a pair of two sides of the rectangular light-emitting element 2.

The first light-transmissive member 3 is made of a light-transmissive material containing, for example, a phosphor as a wavelength conversion material. The first light-transmissive member 3 and the light-emitting element 2 are joined, for example, with the light-transmissive adhesive member 3A. When the light-transmissive adhesive member 3A is provided between the light-extracting surface of the light-emitting element 2 and the first light-transmissive member 3, the light-transmissive adhesive member 3A can be formed on the side surface of the light-emitting element 2 as a fillet. The light-transmissive adhesive member 3A can employ a conventional adhesive such as a silicon resin. The light-transmissive material can employ a material with a refractive index higher than that of a material of the light-guiding plate 7. An example of the light-transmissive material is an epoxy resin, a silicon resin, a mixed resin of these resins, or a glass, and a silicon resin is excellent in terms of light resistance and easy formability.

The first light-transmissive member 3 has a different convertible range of wavelength according to a kind of phosphor, and, therefore, the phosphor is appropriately selected to have a desired wavelength for conversion. An example of the phosphor is a YAG phosphor, a LAG phosphor, a chlorosilicate-based phosphor, a β-SiAlON phosphor, a CASN phosphor, a SCASN phosphor, KSF, a fluoride-based phosphor such as an MGF-based phosphor. In particular, the first light-transmissive member 3 having multiple kinds of phosphors, which can be made of a β-SiAlON phosphor to emit a green light and a fluoride-based phosphor such as a KSF-based phosphor to emit a red light, is capable of expanding a color reproduction range of the light-emitting module 10. The first light-transmissive member 3 can have a diffusing member closer to the light-extracting surface thereof.

The covering member 6 is disposed on the lower surface of the first light-transmissive member 3 and the side surface of the light-emitting element 2 directly or via the light-transmissive adhesive member 3A. The covering member 6 can have a reflectance to reflect a light from the light-emitting element 2 by 60% or more, or by 90% or more. The covering member 6 is formed to have substantially the same outer circumference as first light-transmissive member 3 in a plan view. The covering member 6 has an extent from the lower surface of the first light-transmissive member 3 (the upper surface of the covering member 6) to the lower surface of the covering member 6 to expose the element electrodes 5 therefrom. The covering member 6 can employ, for example, a material in which a matrix material made of a silicon resin contains a light-reflective material made of a titanium oxide. The light-reflective film 4 reduces an extraction amount of light transmitted from the first light-transmissive member 3. The light-reflective film 4 is disposed right above the light-extracting surface of the light-emitting element 2 via the first light-transmissive member 3 and receives a strong light. The light-reflective film 4 prevents the strong light right above the light-emitting element 2 so that the strong light becomes homogeneous above the whole upper surface of the light-guiding plate 7. The light-reflective film 4 can employ, for example, a material in which a silicon resin contains a titanium oxide, and which is formed into a film.

Light-Guiding Plate

As illustrated in FIG. 4, the light-guiding plate 7 has a receiving recess portion 7d (a third recess portion) on a surface contacting the resin portion 8A, and at least a part of the light source portion 1 is disposed in the receiving recess portion 7d (the third recess portion). The light-guiding plate 7 has the first recess portion 7a formed between the neighboring light source portions 1. The light-guiding plate 7 is a transmissive member which receives the light from the light source portion 1 to be emitted as surface-emission. The light-guiding plate 7 can include an optical function portion 7c (a fourth recess portion) on a first primary surface (a front surface) as a light-emitting surface; and the receiving recess portion 7d (the third recess portion) receiving at least a part of the light source portion 1 on a second primary surface (a rear surface) opposite to the first primary surface. In other words, the light-guiding plate 7 has the optical function portion 7c (the fourth recess portion) on the upper surface the light-guiding plate 7, which is provided opposite to the receiving recess portion 7d (the third recess portion). The optical function portion 7c (the fourth recess portion) is formed to diffuse light from the light source portion 1 and the resin portion 8A. The light-guiding plate 7 here has the first recess portion 7a formed on the second primary surface between the light source portions 1 in a plan view. The first recess portion 7a reflects the light from the light source portion 1 toward the first primary surface. An example of a material for the light-guiding plate 7 is a resin material such as an acrylic, a polycarbonate, a cyclic polyolefin, a polyethylene terephthalate, a thermoplastic resin such as a polyester, an epoxy resin, a thermosetting resin such as a silicon resin, or a material having a light-transmittivity such as a glass. In particular, a thermoplastic resin is excellent due to efficient fabrication with an injection molding. A polycarbonate is further excellent due to high transmittivity and low price. The light-guiding plate 7, for example, can be formed by injection molding or transfer molding.

The first recess portion 7a has a triangular groove in a cross-sectional view, which is formed to surround the light source portion 1. The first recess portion 7a is formed to reflect the light from the light source portion 1 toward the first primary surface of the light-guiding plate 7. The first recess portion 7a is formed such that the vertex of the triangular groove has a height equal to a half of a thickness of the light-guiding plate 7. Further, the first recess portion 7a is formed to surround the periphery of the light source portion 1 about the light source portion 1 of the center in a rectangular shape (e.g., a quadrate) as viewed from an upper surface of the light-guiding plate 7. The first recess portion 7a is formed as a triangular groove in a cross-sectional view by arranging the cells C1 adjacent to each other. The vertex of the triangular groove can be used as a guide for a border of the cell C1 in a plan view. The height of the first recess portion 7a here is larger than that of the light-extracting surface of the light source portion 1.

The optical function portion 7c is provided to reflect light from the light-emitting element 2, to diffuse the light in an emitting direction and to average an emission intensity in the light-guiding plate 7. The optical function portion 7c can have any kinds of configuration, for example, the light-guiding plate 7 formed with a member such as a lens having a reflection property or a diffusion property. The optical function portion 7c can be formed with an interface and a substance such as air having a refractive index different from that of the light-guiding plate 7. The optical function portion 7c is formed as a space of a recess in an inverse circular cone, but any size and or shape can be selected appropriately. The optical function portion 7c can be provided at a position where the optical axis, or the center of the optical function portion 7c (a vertex of the recess portion), substantially corresponds to the optical axis of the light-emitting element 2 on their extended lines. The receiving recess portion 7d receives at least a part of the light source portion 1 to provide the light source portion 1 on the light-guiding plate 7. The receiving recess portion 7d, for example, receives the light-reflective film 4 and is formed at a depth such that a portion of the first light-transmissive member 3 is received. The light source portion 1 is bonded to the receiving recess portion 7d with an adhesive bonding member 4A.

The front and rear surfaces of a resin sheet 80A (see FIG. 7C) are heated and melted, then the light-guiding plate 7 is bonded to the substrate 20 via the resin sheet 80A with the intervening light source portion 1. The resin sheet 80A is heated, and the front and rear surfaces of the resin sheet 80A are melted to be an adhesive layer. The resin sheet 80A is bonded to the light-guiding plate 7 and the wiring substrate 20 via the adhesive layer, thereby forming a surface-emitting light source 100A. The resin sheet 80A is heated and a portion of the melted resin sheet 80A is filled in the first recess portion 7a of the light-guiding plate 7. That is, the resin portion 8A is formed such that a portion of the resin sheet 80A is melted and filled in the first recess portion 7a in a process of bonding the first convex portion 8b. The surface of the light-guiding plate 7 and the surface of the wiring substrate 20 are formed in substantially parallel. In the surface-emitting light source 100A, the opening 8a of the resin portion 8A can contact a side surface of the light source portion 1 to bond the light-guiding plate 7 and the wiring substrate 20 to each other via the resin portion 8A preliminarily formed in a sheet form. The surface-emitting light source 100A does not have a clearance between the opening 8a of the resin portion 8A and the side surface of the light source portion 1, and thus the light is not absorbed by the second wiring layer 14. In the surface-emitting light source 100A, use of the resin portion 8A preliminarily formed in a sheet form allows the surface-emitting light source 100A to have a smaller thickness without caring a sink unlike a cured liquid resin.

In the surface-emitting light source 100A, the wiring substrate 20 and the light-guiding plate 7 are bonded to each other via the resin portion 8A. For example, a portion of the resin portion 8A is melted to be the adhesive layer. In this case, the heat affects the wiring substrate 20 or the light-guiding plate 7, and thus a material for the wiring substrate 20 or the light-guiding plate 7 is required to have a melting point which is equal to or higher than that of the resin portion 8A. In the surface-emitting light source 100A, when an adhesive layer or an adhesive agent is provided as a different material on the front and rear surfaces of the resin portion 8A to bond the resin portion 8A to the wiring substrate 20 and the light-guiding plate 7, a temperature limitation of a melting point of a resin for the wiring substrate 20 and the light-guiding plate 7 is relaxed. The surface-emitting light source 100A emits the light as a surface-emitting when the wiring substrate 20 is electrically connected to an external power source to operate ON and OFF thereof. In the surface-emitting light source 100A, when the light is emitted from a plurality of the light source portions 1 toward the light-guiding plate 7, the light toward the optical function portion 7c right above the light source portion 1 is diffused and the light toward the side of the light source portion 1 are reflected upward via the first convex portion 8b. The light diffused and spread by the optical function portion 7c and the light reflected from the first convex portion 8b become a homogeneous light in the light-guiding plate 7 in the surface direction, and the homogeneous light is extracted outside of the surface-emitting light source 100A.

Figure 6A:
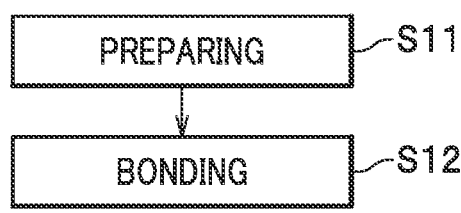
FIG. 6A is a flowchart illustrating a method of manufacturing the surface-emitting light source according to the first embodiment.
Figure 6B:
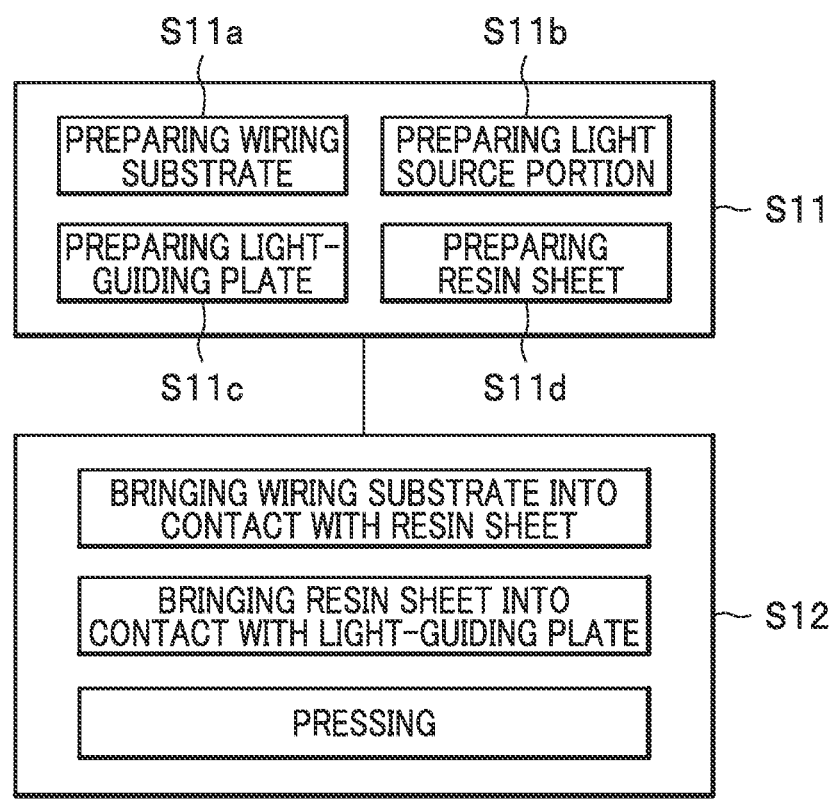
FIG. 6B is a detailed explanatory diagram illustrating the flowchart of FIG. 6A.
Figure 7A:
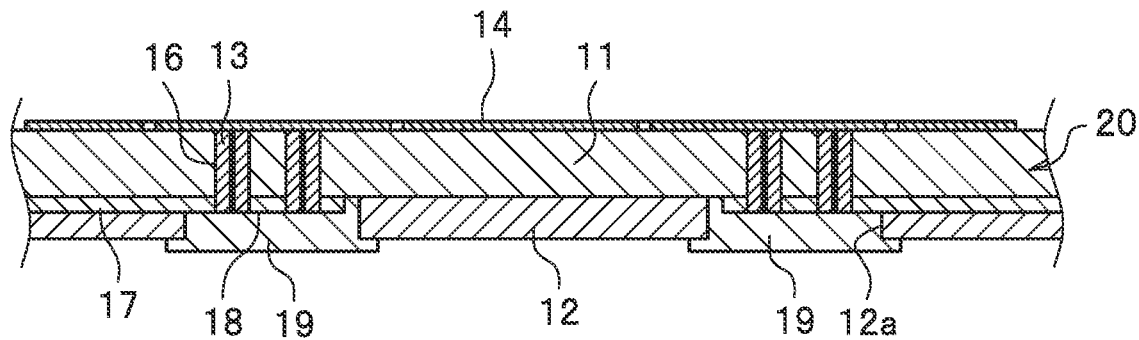
FIG. 7A is a cross-sectional view schematically illustrating the wiring substrate which is prepared by using a process of preparing wiring substrate in the method of manufacturing the surface-emitting light source according to the first embodiment.
Figure 7B:
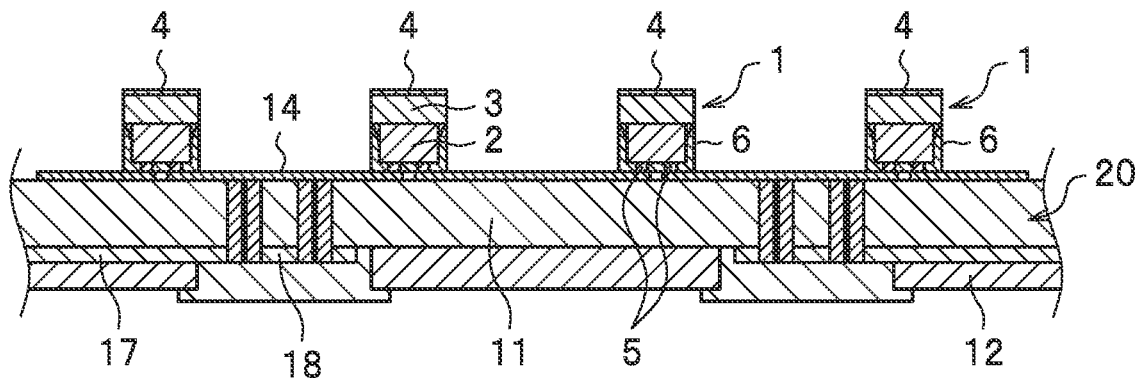
FIG. 7B is a cross-sectional view schematically illustrating a configuration in which light-emitting elements are disposed on the wiring substrate in the method of manufacturing the surface-emitting light source according to the first embodiment.
Figure 7C:
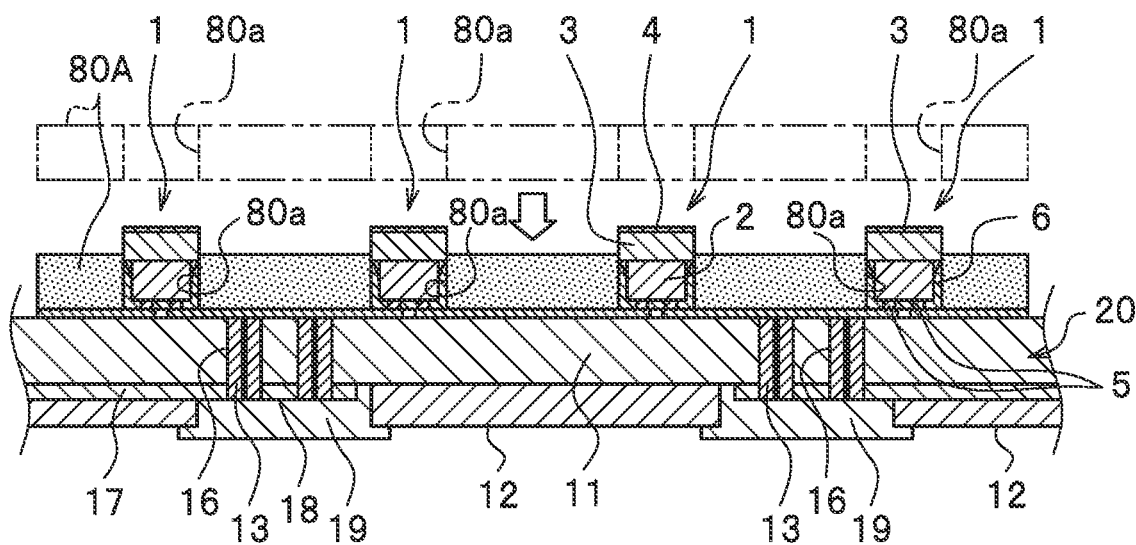
FIG. 7C is a cross-sectional view schematically illustrating a configuration in which a resin sheet contacts the wiring substrate in the method of manufacturing the surface-emitting light source according to the first embodiment.
Figure 7D:
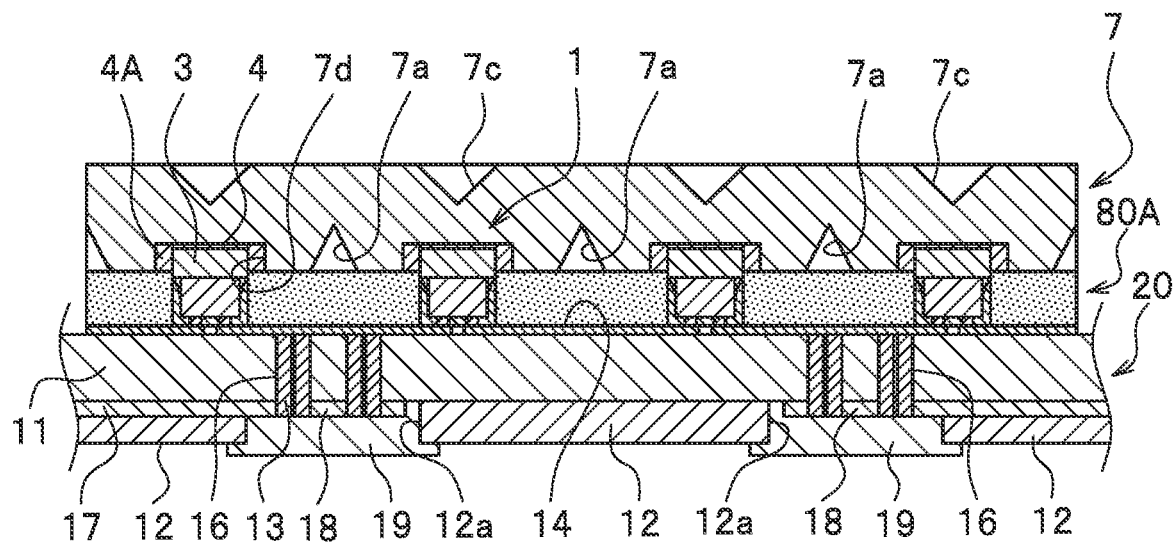
FIG. 7D is a cross-sectional view schematically illustrating a configuration in which the light-guiding plate contacts the resin sheet in the method of manufacturing the surface-emitting light source according to the first embodiment.
Figure 7E:
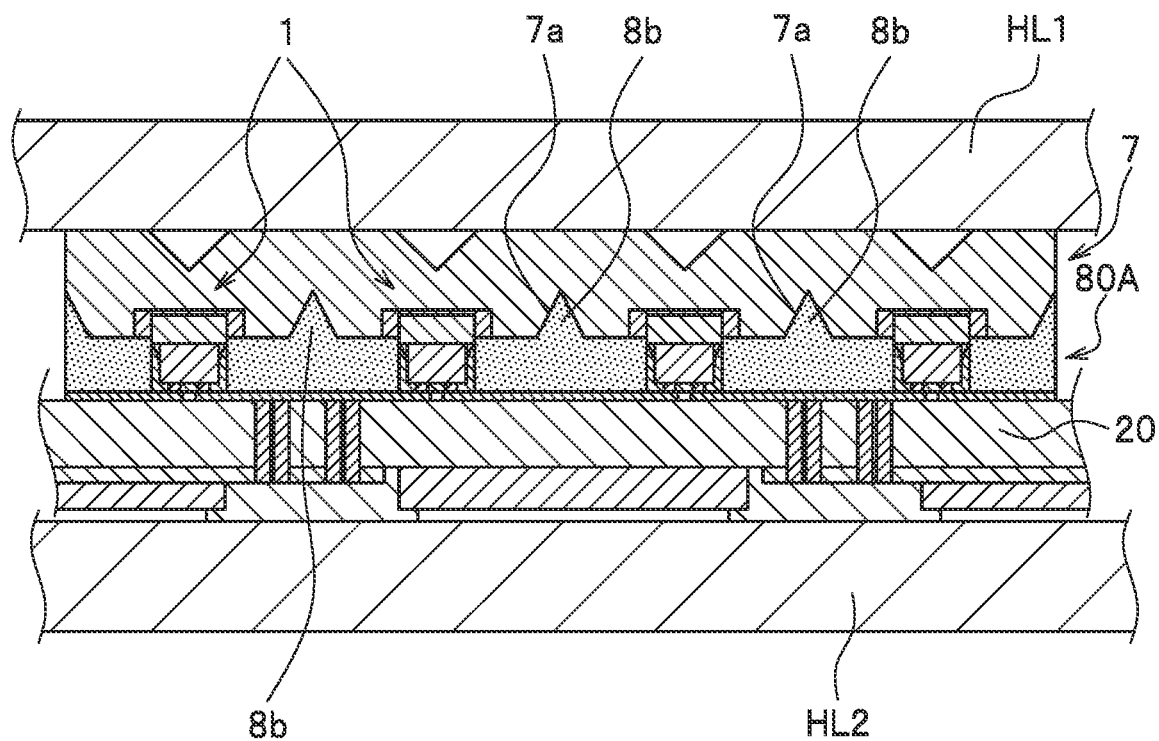
FIG. 7E is a cross-sectional view schematically illustrating a process of bonding in the method of manufacturing the surface-emitting light source according to the first embodiment.

Next, a method of manufacturing the surface-emitting light source 100A will be described with references to FIGS. 6A, 6B and 7A through 7E. FIG. 6A is a flowchart illustrating a method of manufacturing the surface-emitting light source according to the first embodiment. FIG. 6B is a detailed explanatory diagram illustrating the flowchart of FIG. 6A. FIG. 7A is a cross-sectional view schematically illustrating the wiring substrate which is prepared by using a process of preparing wiring substrate in the method of manufacturing the surface-emitting light source according to the first embodiment. FIG. 7B is a cross-sectional view schematically illustrating a configuration in which light-emitting elements are disposed on the wiring substrate in the method of manufacturing the surface-emitting light source according to the first embodiment. FIG. 7C is a cross-sectional view schematically illustrating a configuration in which a resin sheet contacts the wiring substrate in the method of manufacturing the surface-emitting light source according to the first embodiment. FIG. 7D is a cross-sectional view schematically illustrating a configuration in which the light-guiding plate contacts the resin sheet in the method of manufacturing the surface-emitting light source according to the first embodiment. FIG. 7E is a cross-sectional view schematically illustrating a process of bonding in the method of manufacturing the surface-emitting light source according to the first embodiment.

The method of manufacturing the surface-emitting light source 100A includes a process S11 of preparing: the wiring substrate 20 including the light source portion 1 electrically connected to the second wiring layer 14; the light-guiding plate 7; and the light-reflective resin sheet 80A and the opening 80a with the same size as an area of the side surface of the light source portion 1; and a process S12 of bonding: the wiring substrate 20 and the resin sheet 80A to each other with a portion of the resin sheet 80A melted by heating after the resin sheet 80A contacts the wiring substrate 20 while a light-extracting surface of the light source portion 1 is exposed from the resin sheet 80A via the opening 80a of the resin sheet 80A; and the resin sheet 80A and the light-guiding plate 7 to each other with a part of the resin sheet 80A melted by heating after light-guiding plate 7 contacts the resin sheet 80A.

The process S11 of preparing includes a sub-process S11a of preparing wiring substrate, a sub-process S11b of preparing light source portion, a sub-process S11c of preparing light-guiding plate and a sub-process S11d of preparing resin sheet. The processes can be performed at any timing, and each process can be performed in parallel, or any process can be performed first. The sub-process S11a includes: forming the first wiring layer 17 having the wiring pad 18, the first covering layer 12, the vias 16, the conductive members 13 filled in the vias 16 and the protection member 19 on the rear surface of the base member 11; and preparing the wiring substrate 20 by forming the second wiring layer 14 on the front surface of the base member 11.

In the sub-process S11a, the first wiring layer 17 is formed in a prescribed circuit pattern on the rear surface of the base member 11 and the second wiring layer 14 is formed in a prescribed circuit pattern. The first covering layer 12 is formed to have an opening and to cover the first wiring layer 17 by setting a mask at a portion facing the wiring pad 18 with a method such as a screen printing. Next, the via 16 is formed at a position of the wiring pad 18 with a method such as a drilling or a punching. Further, the conductive members 13 such as a conductive paste is filled in the vias 16 with a method such as a screen printing, and then the protection member 19 is formed to cover the wiring opening portion 12a of the first covering layer 12.

The sub-process S11b includes forming the light source portion 1. In the sub-process S11b, the light-emitting element 2 is arranged on a sheet at regular intervals and the first light-transmissive member 3 is bonded on the light-extracting surface of the light-emitting element 2 via the light-transmissive adhesive member 3A (see FIG. 4). The light-reflective film 4 is preliminary formed on the upper surface of the first light-transmissive member 3. The covering member 6 is filled to be substantially flush with the light-reflective film 4 of the first light-transmissive member 3 to form the light source portion 1 by using singulation. The covering member 6 can also be filled to cover the light-reflective film 4 of the first light-transmissive member 3, then a process of cutting is performed to expose the light-reflective film 4, and then the light source portion 1 is formed by using singulation. The element electrodes 5 of the light source portion 1 prepared is electrically connected to a prescribed position of the second wiring layer 14 on the wiring substrate 20.

The sub-process S11c includes forming the light-guiding plate 7 by, for example, processing a plate member made of material such as an acrylic. In the sub-process S11c, the light-guiding plate 7 is formed by processing the first recess portion 7a, the receiving recess portion 7d (the third recess portion) and the optical function portion 7c. The receiving recess portion 7d is formed so as to provide the light source portion 1 at a position closer to the lower surface facing the light-extracting surface of the light source portion 1. The sub-process S11d includes forming the resin sheet 80A, in which the opening 80a is formed at a prescribed thickness. In the sub-process S11d, for example, the resin sheet 80A is formed with 16 openings 80a as 16 cells which constitute one unit. The opening 80a of the resin sheet 80A is formed with a size without clearance to contact the side of the light source portion 1. The resin sheet 80A can be made as a light-reflecting sheet made of, for example, an acrylic resin or an epoxy resin which contain a titanium oxide. After completion of the process S11 which includes preparing the wiring substrate 20 connecting the light source portion 1, the light-guiding plate 7 and the resin sheet 80A to be the resin portion 8A, then the process S12 is performed.

The process S12 includes bringing the resin sheet 80A into contact with the wiring substrate 20, bringing the light-guiding plate 7 into contact with the resin sheet 80A, and bonding the resin sheet 80A to the wiring substrate 20 and the light-guiding plate 7 by heating. In the process S12, first, the resin sheet 80A contacts the second wiring layer 14 of the wiring substrate 20. When the resin sheet 80A contacts the wiring substrate 20, the light source portion 1 is inserted into the opening 80a of the resin sheet 80A, and then arrangement of the resin sheet 80A is completed. Next, the light-guiding plate 7 contacts the resin sheet 80A. When the light-guiding plate 7 contacts the resin sheet 80A, the receiving recess portion 7d of the light-guiding plate 7 receives a part of the light source portion 1 exposed from the resin sheet 80A. The bonding member 4A is preliminarily filled in the receiving recess portion 7d of the light-guiding plate 7 to bond the light source portion 1. Lastly, pressing is performed to press the surface-emitting light source 100A, for example, with hot plates HL1 and HL2 which are capable of controlling heat and placed at the top and the bottom of the surface-emitting light source 100A. The pressing can be performed with the hot plates HL1 and HL2 which have a releasable film.

In the pressing, the hot plates HL1 and HL2 which are heated at a prescribed temperature press the surface-emitting light source 100A to bond the light-guiding plate 7, the resin sheet 80A, and wiring substrate 20 together. In the pressing, the upper and lower surfaces of the heated resin sheet 80A are melted to be the adhesive layer which bonds the light-guiding plate 7 and the wiring substrate 20 to each other and bonds the wiring substrate 20 and the resin sheet 80A to each other via the adhesive layer. The portion of the melted surface of the resin sheet 80A is pressurized and filled in the first recess portion 7a of the light-guiding plate 7, thereby forming the first convex portion 8b. The resin sheet 80A is cured to be the resin portion 8A with the first convex portion 8b. In the process S12, a portion of the melted resin sheet 80A is filled in the first recess portion 7a to form the first convex portion 8b on the resin sheet 80A. In the process S12, the first light-transmissive member 3, which is disposed on the light-extracting surface of the light source portion 1, can be additionally bonded to the receiving recess portion 7d of the light-guiding plate 7.

As described above, the surface-emitting light source 100A employs a resin preliminarily formed in a sheet form, thereby preventing the resin from having a sink as compared to a resin which is formed by preliminarily curing a fluid resin on the wiring substrate 20 and allowing the surface-emitting light source 100A to be thinner. Further, the opening 8a of the resin portion 8A contacts the side surface of the light source portion 1 and no clearance is formed between the opening 8a and the side surface of the light source portion 1, thereby preventing the light from being absorbed by the second wiring layer 14. This allows the surface-emitting light source 100A to diffuse the light from the light source portion 1 into the light-guiding plate 7 with the optical function portion 7c or the first convex portion 8b and to emit homogeneous light in surface-emission.

Second Embodiment

Figure 8:
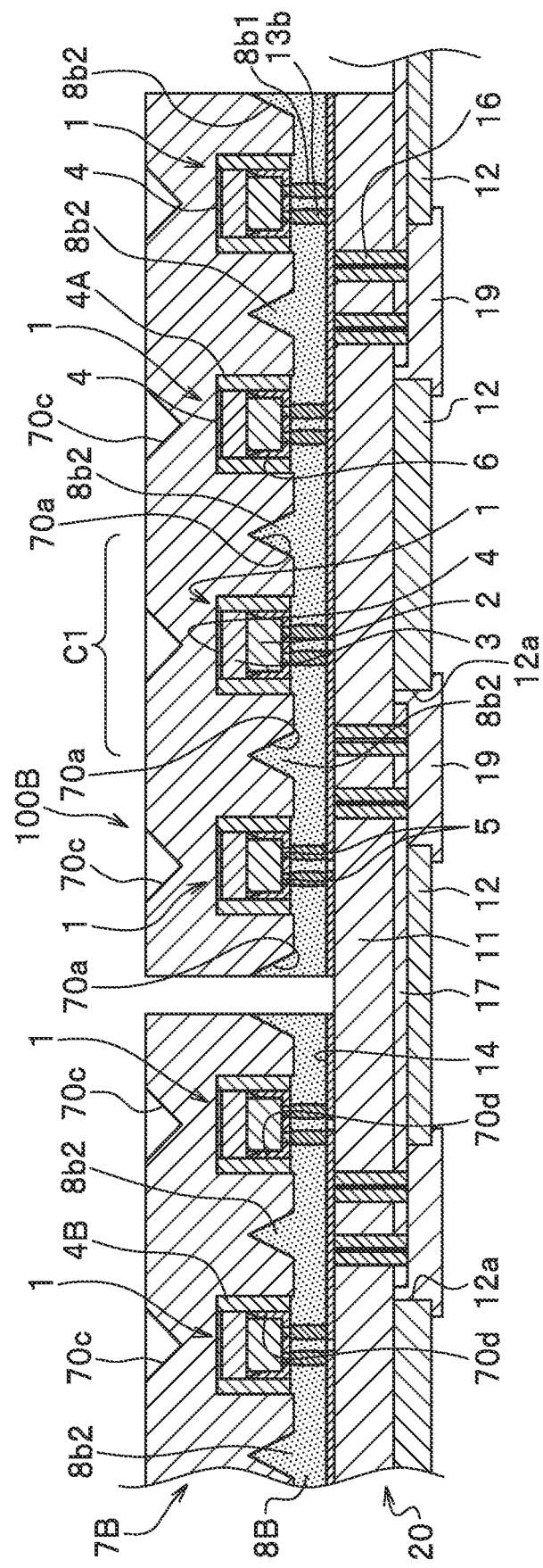
FIG. 8 is a cross-sectional view schematically illustrating a surface-emitting light source according to a second embodiment of the present disclosure, in which a part of thereof is omitted.
Figure 9:
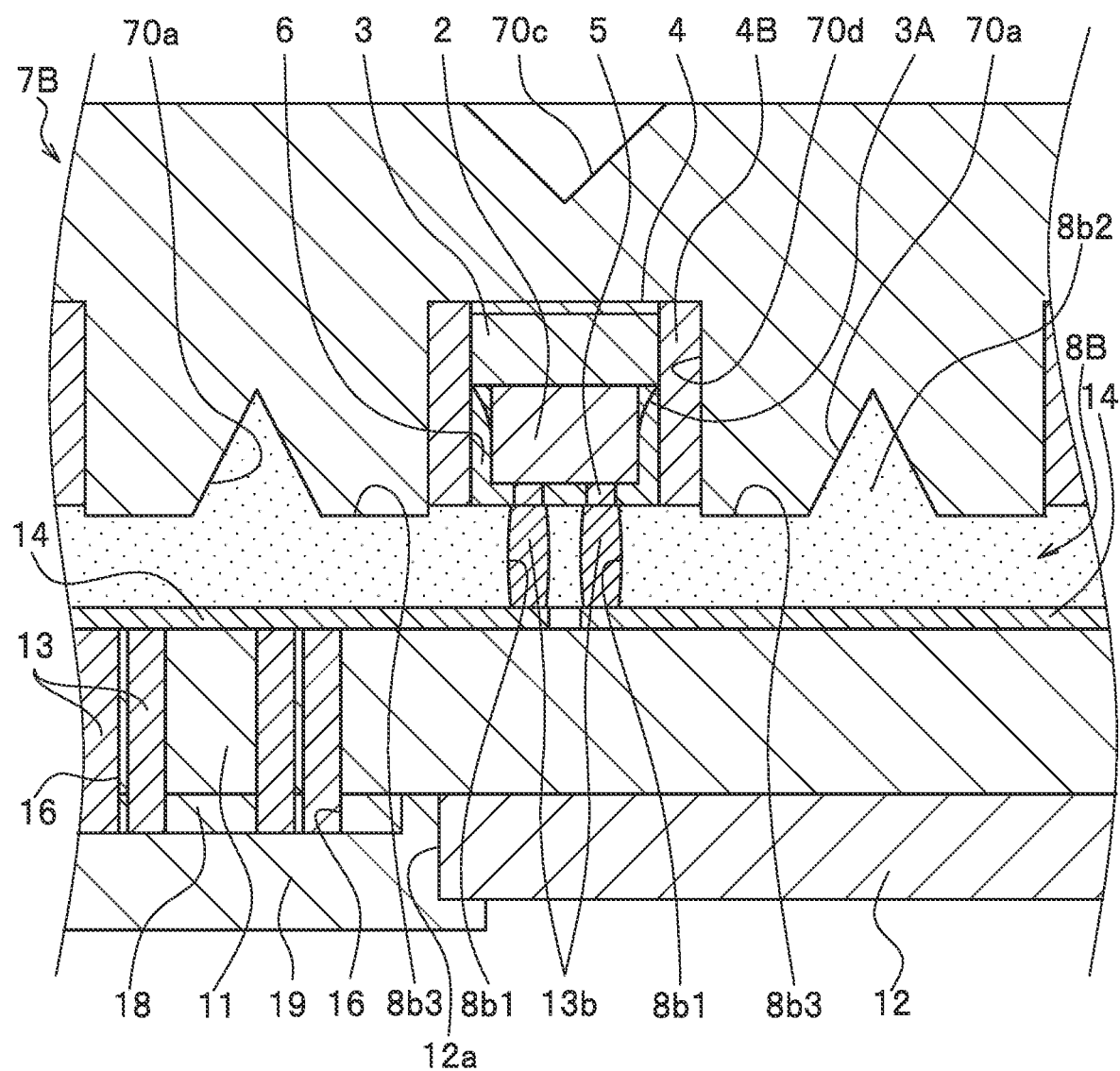
FIG. 9 is an enlarged cross-sectional view schematically illustrating a cell of the surface-emitting light source of FIG. 8.

A configuration of a surface-emitting light source according to a second embodiment will be described with reference to FIGS. 8 and 9. FIG. 8 is a cross-sectional view schematically illustrating a surface-emitting light source according to a second embodiment, in which a part of thereof is omitted. FIG. 9 is an enlarged cross-sectional view schematically illustrating a cell of the surface-emitting light source of FIG. 8. Note that, as to the same configuration members described above, the same reference numerals can be added, and the descriptions can be omitted. A surface-emitting light source 100B includes: the wiring substrate 20 having a first wiring layer 17 and a second wiring layer 14 on the base member 11; a light-guiding plate 7B disposed to face the wiring substrate 20; a light-reflective resin portion 8B disposed between the light-guiding plate 7B and the wiring substrate 20; and the light source portion 1. The light source portion 1 includes the element electrodes 5 electrically connected to the second wiring layer 14 via openings formed to face the element electrodes 5, respectively and to open in a thickness direction of the resin portion 8B. The light source portion 1 has the light-extracting surface provided to face the light-guiding plate 7B with electrical connection. The openings (via holes 8b1) formed in the resin portion 8B have a size where the resin portion 8B contacts the side of the element electrodes 5. Further, in the surface-emitting light source 100B, the resin portion 8B and light-guiding plate 7B face each other and are bonded to each other, and the resin portion 8B and the wiring substrate 20 face each other and are bonded to each other.

Hereinafter, parts different from the first embodiment will be mainly described. The second embodiment has different parts form the first embodiment, which are a configuration of the resin portion 8B and the light-guiding plate 7B, and the other configurations and parts are the same as the first embodiment. The parts different from the first embodiment in each configuration will be mainly described. The resin portion 8B has the via holes 8b1 as an opening formed to face the element electrodes 5 of the light source portion 1. The element electrodes 5 of the light source portion 1 are connected to the second wiring layer 14 of the wiring substrate 20 via conductive members 13b filled in the via holes 8b1. The resin portion 8B has a first convex portion 8b2 formed to surround the via holes 8b1. The via holes 8b1 as an opening are, for example, formed to contact the side surface of the element electrodes 5. That is, when a shape of the element electrodes 5 as viewed from the first surface (a bottom of the light source portion 1) is, for example, a triangle, a shape of the openings of the via holes 8$b$1 can be also formed to be a triangle. When the element electrodes 5 is a rectangle continuous from one end to the other end under the lower surface of the light-emitting element 2, each shape of the openings of the via holes 8$b$1 can be also formed to be a rectangle. A material of the conductive members 13$b$ filled in the via holes 8$b$1 is, for example, a solder paste which can be filled by a screen printing.

One of the surfaces of the resin portion 8B includes a step portion 8$b$3 having a step at a boundary of a receiving recess portion 70$d$ of the light-guiding plate 7B with respect to the other area. As described in a method of manufacturing below, the step portion 8$b$3 facilitates to fill a first recess portion 70$a$ of the light-guiding plate 7B with a portion of the melted resin portion 8B. That is, the step portion 8$b$3 facilitates to collect the melted resin thereon and to form the first convex portion 8$b$2. The first convex portion 8$b$2 here is formed to have a height equal to that of the light-emitting element 2. Distances between the first convex portions 8$b$2, a shape and a function of the first convex portion 8$b$2 are the same as described above.

A configuration of the light-guiding plate 7B has basically the same configuration as the first embodiment. Meanwhile, since the configuration of the resin portion 8B has been changed, a thickness of the light-guiding plate 7B and a depth of the receiving recess portion 70$d$ are formed to be larger, and the first recess portion 7$a$ is formed without changing its height. The light source portion 1 is received in the receiving recess portion 70$d$ via the light-reflective film 4, the first light-transmissive member 3 and a bonding member 4B formed on the side surface of the covering member 6. The bonding member 4B is made of a light-transmissive silicon resin and transmits the light from the light-emitting element 2, the first light-transmissive member 3 and the light-reflective film 4.

Figure 10A:
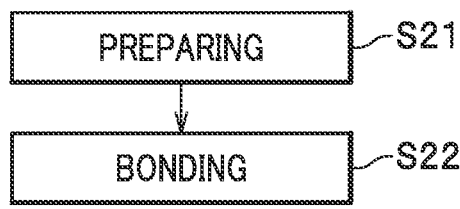
FIG. 10A is a flowchart illustrating another method of manufacturing the surface-emitting light source according to the second embodiment.
Figure 10B:
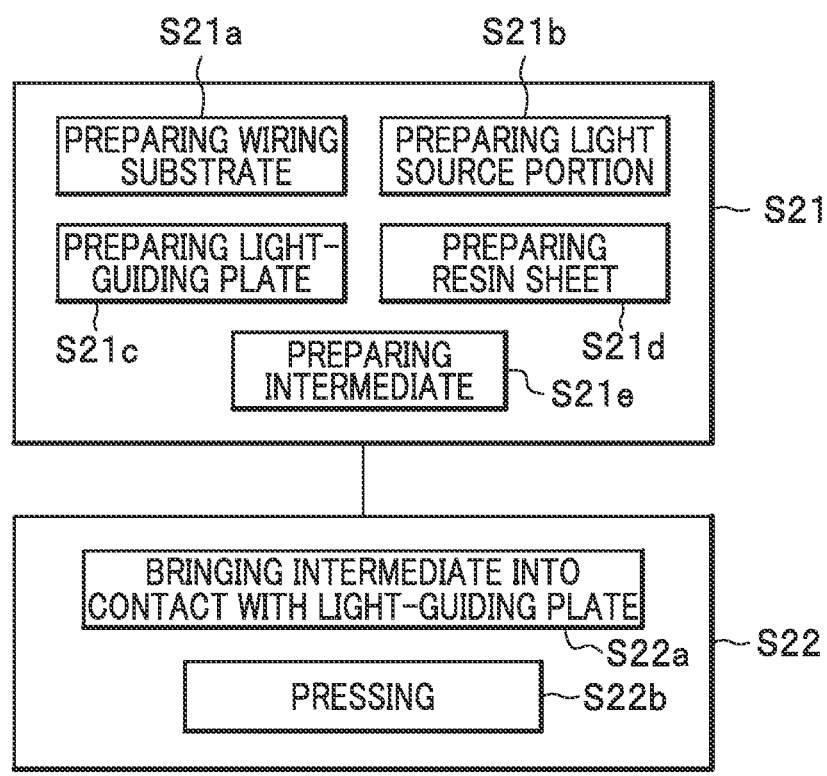
FIG. 10B is a detailed explanatory diagram illustrating the flowchart of FIG. 10A.
Figure 11A:
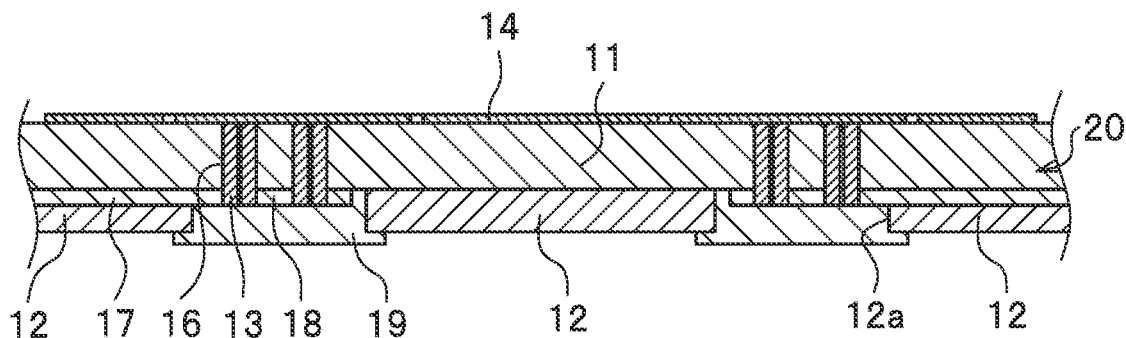
FIG. 11A is a cross-sectional view schematically illustrating a wiring substrate which is prepared by using a process of preparing wiring substrate in the method of manufacturing the surface-emitting light source according to the second embodiment.
Figure 11B:
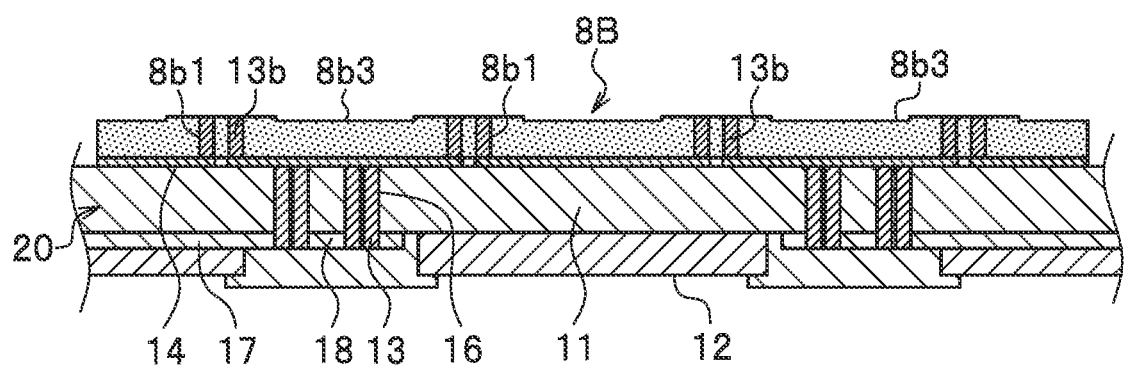
FIG. 11B is a cross-sectional view schematically illustrating a configuration in which a resin sheet contacts the wiring substrate in the method of manufacturing the surface-emitting light source according to the second embodiment.
Figure 11C:
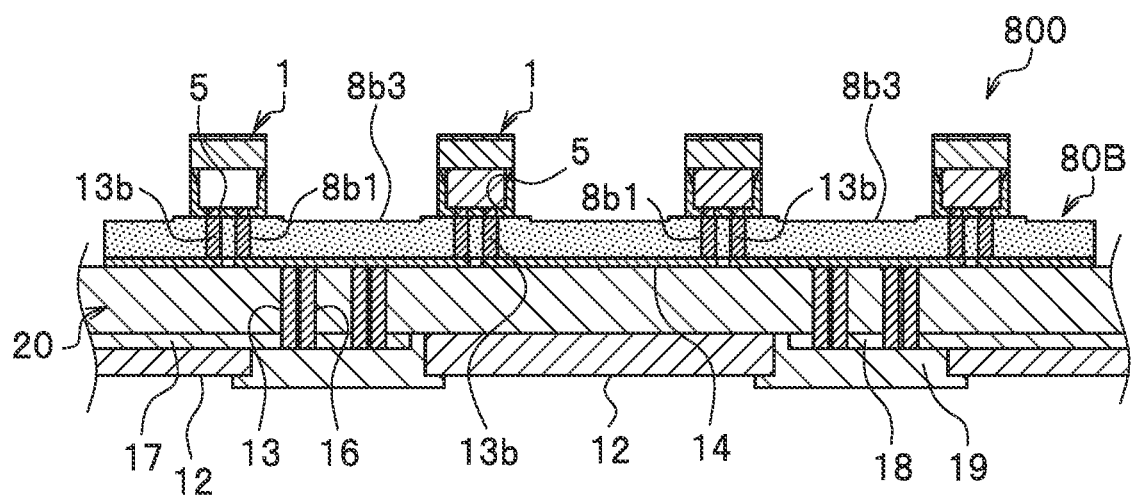
FIG. 11C is a cross-sectional view schematically illustrating a configuration in which an intermediate having the light-emitting elements disposed on the resin sheet is formed in the method of manufacturing the surface-emitting light source according to the second embodiment.
Figure 11D:
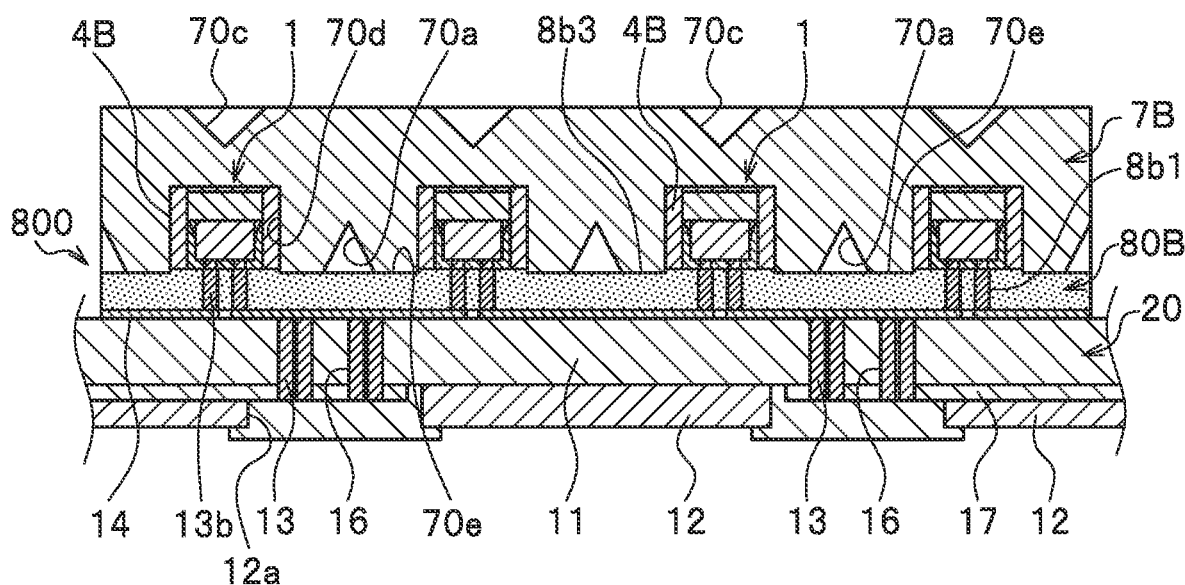
FIG. 11D is a cross-sectional view schematically illustrating a configuration in which a light-guiding plate contacts the resin sheet on the intermediate in the method of manufacturing the surface-emitting light source according to the second embodiment.
Figure 11E:
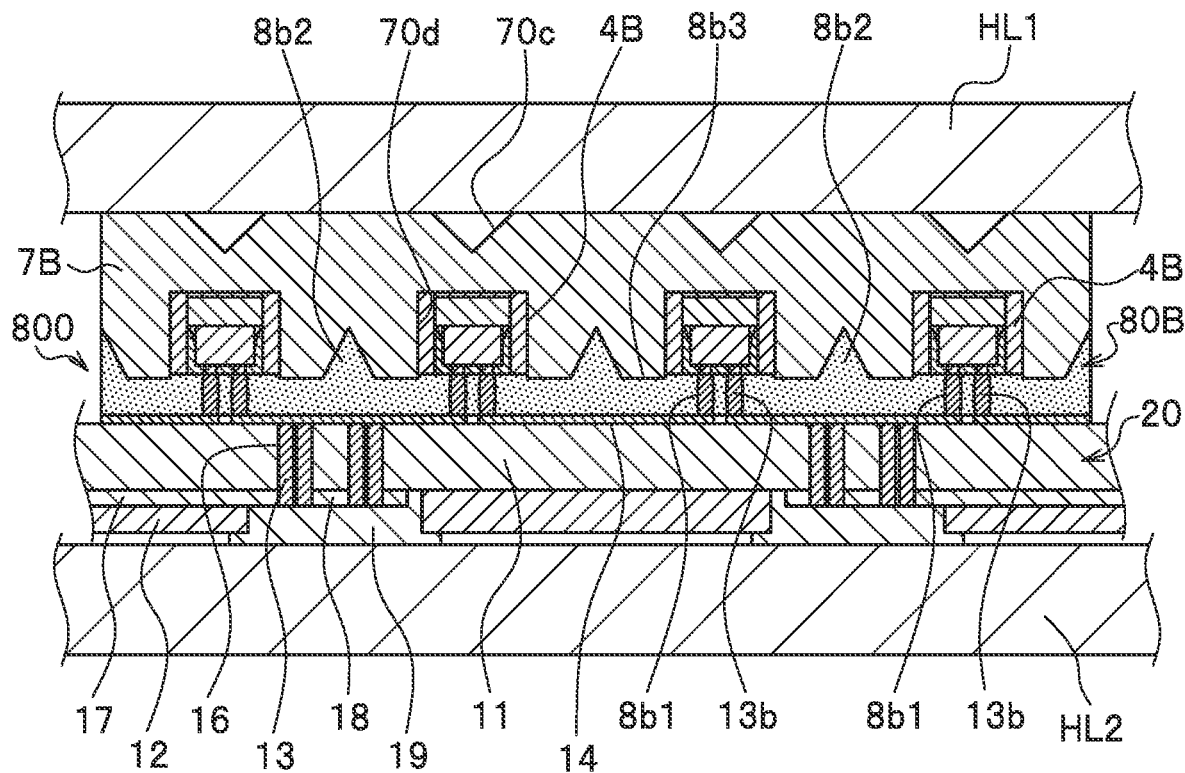
FIG. 11E is a cross-sectional view schematically illustrating a process of bonding in the method of manufacturing the surface-emitting light source according to the second embodiment.

Next, a method of manufacturing the surface-emitting light source 100B according to the second embodiment will be described with references to FIGS. 10A, 10B, 11A through 11E. FIG. 10A is a flowchart illustrating another method of manufacturing the surface-emitting light source according to the second embodiment. FIG. 10B is a detailed explanatory diagram illustrating the flowchart in FIG. 10A. FIG. 11A is a cross-sectional view schematically illustrating a wiring substrate prepared by using a process of preparing wiring substrate in the method of manufacturing the surface-emitting light source according to the second embodiment. FIG. 11B is a cross-sectional view schematically illustrating a configuration in which a resin sheet contacts the wiring substrate in the method of manufacturing the surface-emitting light source according to the second embodiment. FIG. 11C is a cross-sectional view schematically illustrating a configuration in which an intermediate having the light-emitting elements disposed on the resin sheet is formed in the method of manufacturing the surface-emitting light source according to the second embodiment. FIG. 11D is a cross-sectional view schematically illustrating a configuration in which a light-guiding plate contacts the resin sheet on the intermediate in the method of manufacturing the surface-emitting light source according to the second embodiment. FIG. 11E is a cross-sectional view schematically illustrating a process of bonding in the method of manufacturing the surface-emitting light source according to the second embodiment.

The method of manufacturing the surface-emitting light source 100B includes a process S21 of preparing: an intermediate 800 electrically connecting the element electrodes 5 of the light source portion 1 to the first wiring layer 17 of the wiring substrate 20 via the via holes 8$b$1 as an opening of a resin sheet 80B in contact with the wiring substrate 20; and the light-guiding plate 7B. The method includes a process S22 of bonding: the wiring substrate 20 and the resin sheet 80B to each other by bringing the resin sheet 80B into contact with the wiring substrate 20 and heating the resin sheet 80B and the wiring substrate 20 to melt a portion of the resin sheet 80B (front and rear surfaces); and further bonding the resin sheet 80B and the light-guiding plate 7B to each other.

As an example, the process S21 includes a sub-process S21$a$ of preparing the wiring substrate 20, a sub-process S21$b$ of preparing the light source portion 1, a sub process S21$c$ of preparing the light-guiding plate 7B, a sub-process S21$d$ of preparing the resin sheet 80B, and a sub-process S21$e$ of preparing the intermediate 800. The sub-process S21$a$ has the same process as the sub-process S11$a$ implemented. The sub-process S21$b$ has the same process as the sub-process S11$b$ implemented. The sub-process S21$c$ is implemented to prepare the light-guiding plate 7B including the first recess portion 70$a$, the receiving recess portion 70$d$, and the optical function portion 70$c$. The sub-process S21$d$ is implemented to prepare the via holes 8$b$1 as an opening and the resin sheet 80B having the via holes 8$b$1 filled with the conductive members 13$b$. The sub-process S21$e$ is implemented to electrically connect the conductive members 13$b$ exposed to one end of the via holes 8$b$1 of the resin sheet 80B to the element electrodes 5 of the light source portion 1 and to prepare the intermediate 800 where the resin sheet 80B and the wiring substrate 20 contact each other. In the intermediate 800, when the resin sheet 80B contacts the wiring substrate 20, the conductive members 13$b$ exposed to the other end of the via holes 8$b$1 is electrically connected to the second wiring layer 14 of the wiring substrate 20 at its prescribed position.

Subsequently, the process S22 includes a sub-process S22$a$ of bringing the intermediate 800 into contact with the light-guiding plate 7B such that the light source portion 1 of the intermediate 800 is received in the receiving recess portion 70$d$ of the light-guiding plate 7B, and a sub-process S22$b$ of pressing. The light source portion 1 of the intermediate 800 is provided in the receiving recess portion 70$d$ via bonding member 4B preliminarily provided in the receiving recess portion 70$d$ of the light-guiding plate 7B. When the sub-process S22$b$ is implemented with pressing and heating, the intermediate 800 and resin sheet 80B face each other and are bonded to each other on their facing surfaces and the resin sheet 80B and the wiring substrate 20 face each other and are bonded to each other on their facing surfaces with the adhesive layers which are melted portions of an upper and a lower surfaces of the resin sheet 80B. The first convex portion 8$b$2 is formed by filling the first recess portion 70$a$ of the light-guiding plate 7B with a portion of the melted resin sheet 80B while the resin sheet 80B and the light-guiding plate 7B are pressed against each other. The resin sheet 80B becomes the resin portion 8B having the first convex portion 8$b$2 after the light-guiding plate 7B and the wiring substrate 20 are bonded to each other and the resin sheet 80B is cured. Further, the light source portion 1 is received in the receiving recess portion 70$d$ of the light-guiding plate 7B via the bonding member 4B, and the light-guiding plate 7B contacts the resin sheet 80B such that the element electrodes 5 of the light source portion 1 is connected to the conductive members 13$b$ of the resin sheet 80B.

In the pressing in the process S22, the light-guiding plate 7B, the resin sheet 80B and the wiring substrate 20 are bonded together by pressing and heating. In the pressing, the light-guiding plate 7B and the resin sheet 80B are bonded to each other and the resin sheet 80B and the wiring substrate 20 are bonded to each other via the adhesive layer which are formed by melting the upper and lower surfaces of the heated resin sheet 80B. The first recess portion 70a is filled with a part of the upper and the lower surfaces of the melted resin sheet 80B by the pressing to form the first convex portion 8b2. When the step portion 8b3 is formed at the one end of the resin sheet 80B, a portion of the melted resin is easily collected, thereby easily forming the first convex portion 8b2. The resin sheet 80B and the light-guiding plate 7B are bonded to each other and the resin sheet 80B and the wiring substrate 20 are bonded to each other without any gap by a pressure in the pressing, thereby forming the surface-emitting light source 100B. When the resin sheet 80B is cured, the surface-emitting light source 100B is formed with the resin portion 8B including the first convex portion 8b2. When the pressing is performed with heating, the via holes 8b1 and the conductive members 13b which are formed in the resin sheet 80B deform from a straight tubular shape to a barrel shape where the central portion is larger than the top and the bottom portion, but this does not matter for electrical connection.

As described above, the surface-emitting light source 100B employs pre-formed resin sheet in the resin portion 8B, thereby preventing the resin portion 8B from occurrence of a sink compared to a resin formed with preliminarily curing a liquid resin on the wiring substrate 20 and reducing a thickness of the whole surface-emitting light source 100B. When a reflective sheet which does not melt is provided on a wiring substrate, this requires an adhesive agent separately and increases a thickness of the whole surface-emitting light source 100B. In contrast, the surface-emitting light source 100B reduces in thickness. Further, the via holes 8b1 as an opening of the resin portion 8B contact the side surface of the element electrodes 5 of the light source portion 1, and thus the light is not absorbed by the second wiring layer 14.

Next, a configuration of a surface-emitting light source according to a third embodiment will be described with reference to FIGS. 12 and 13. FIG. 12 is a plan view illustrating a surface-emitting light source according to a third embodiment. FIG. 13 is a cross-sectional view taken along XIII-XIII in FIG. 12. Note that, as to the same configuration members described above, the same reference numerals can be added, and the descriptions can be appropriately omitted. Hereinafter, parts different from the first embodiment will be mainly described. The third embodiment has different parts form the first embodiment, which are a configuration of a resin portion 8D and a light-guiding plate 7D, and the other configurations and parts are the same as the first embodiment. A surface-emitting light source 100D will be described in a way where, for example, it has 25 cells (per one unit) or five cells multiplied by five cells, and a multi-unit configuration.

The surface-emitting light source 100D includes: the wiring substrate 20 having the first wiring layer 17 on the base member 11; the light-guiding plate 7D having the first primary surface and the second primary surface that is opposite to the first primary surface, faces the wiring substrate 20 and includes a receiving hole 7e (a through hole); the light-reflective resin portion 8D which is filled in a through groove 7f as a through hole of the second primary surface and disposed between the light-guiding plate 7D and the wiring substrate 20; the light source portion 1 including the element electrodes 5 on the first surface, and the light-extracting surface on the second surface opposite to the first surface; and the conductive members 13 electrically connecting the element electrodes 5 to the wiring layer (the second wiring layer 14 and the first wiring layer 17). The light-guiding plate 7D contacts the resin portion 8D. The resin portion 8D and light-guiding plate 7D face each other and are bonded to each other on their facing surfaces, and the resin portion 8D and the wiring substrate 20 face each other and are bonded to each other on their facing surfaces.

The third embodiment will be described in which the receiving hole 7e corresponding to a receiving recess portion receiving the first light-transmissive member 3 of the light source portion 1 is preliminarily formed in the light-guiding plate 7D. A receiving hole 7e is preliminarily formed in the light-guiding plate 7D so as to extend through the light-guiding plate 7D from the first primary surface to the second primary surface in a size large enough to receive the first light-transmissive member 3. The light-guiding plate 7D can have a configuration of a recess or a through hole, and the configuration of the through hole is selected in this case. The third embodiment will be also described in which the configuration includes the through groove 7f receiving a first convex portion 8d and the receiving hole 7e receiving a part of or the whole light source portion 1.

The light-guiding plate 7D includes the receiving hole 7e extending through the light-guiding plate 7D above the light source portion 1 in the thickness direction and the through groove 7f extending through the light-guiding plate 7D in the thickness direction at the border of a cell C1. The receiving hole 7e is formed in a circle in a plan view and in a size where the periphery of the light source portion 1 (the light-reflective film 4 and bonding member 4A) is inside the circle. The receiving hole 7e receives the first light-transmissive member 3, the bonding member 4A provided on the side surface of the first light-transmissive member 3, the light-reflective film 4, a color adjustment layer 21 and a sealing resin 22 from the light source portion 1.

The color adjustment layer 21 is provided above the light-reflective film 4 and the bonding member 4A. The color adjustment layer 21 is provided to adjust a color of a light from the light-emitting element 2 into a prescribed color. The color adjustment layer 21 employs a resin containing a wavelength conversion material such as a phosphor. The sealing resin 22 is disposed to cover the color adjustment layer 21 and to seal the receiving hole 7e. The sealing resin 22 employs a light-transmissive resin such as a silicon resin. The sealing resin 22 is formed in a cylinder shape according to a shape of the receiving hole 7e since the receiving hole 7e has a cylinder shape. The upper surface of the sealing resin 22 is formed with a light-blocking layer 23 to cover a larger area than the sealing resin 22.

The light-blocking layer 23 is formed to reduce a light from the light source portion 1. The light-blocking layer 23 has a shape such as a rectangle (a quadrangle). The light-blocking layer 23 has a side which is equal to or longer than a diameter of the receiving hole 7e having a circular plan view. The light-blocking layer 23 can be formed in a rectangle having a side having a length which is 1.05 to 1.5 times or 1.1 to 1.3 times as long as the diameter of the receiving hole 7e. The light-blocking layer 23, however, is not limited to a rectangle but can include polygons such as a pentagon, a hexagon and an octagon, a circle or an oval. When the light-blocking layer 23 has a shape such as the polygons or the circle, a size of the light-blocking layer 23 can be 1.05 to 2.0 times as long as the diameter of the receiving hole 7e. The light-blocking layer 23 is provided such that, in a plan view, the light-blocking layer 23 rotates at 45 degrees with respect to an arrangement of the light-reflective film 4 and the four corners of the light-reflective film 4 are directed to the four sides of the light-blocking layer 23. The formation above allows a light, which tends to gather at the corners, to be dispersed. The light-blocking layer 23, for example, can have a reflectance so as to reflect 60% or more of a light from the light-emitting element 2.

The through groove 7f has an elongate rectangular shape in a vertical cross-sectional view. The through groove 7f is formed, in a plan view, to separately arrange a rectangle (quadrangle) having a size equal to the cell C1 in a matrix. The through groove 7f is, in a manufacturing process described later, filled with a portion of the melted resin portion 8D which is pushed from the second primary surface and is cured to form the first convex portion 8d. The through groove 7f is also filled and sealed with a resin 24 from the first primary surface of the light-guiding plate 7D. The resin 24 is provided to improve a partitionability for reducing an effect of a light which is generated by turning on and off the neighboring light source portion 1. The resin 24 can employ the same material as the covering member 6 described above. The through groove 7f can be filled and sealed with the first convex portion 8d alone pushed from the second primary surface of the light-guiding plate 7D. The through groove 7f is, for example, formed with a constant groove width in a vertical cross-sectional view.

The through groove 7f can be formed at a narrow width portion which is positioned near the first primary surface of the light-guiding plate 7D. The narrow width portion formed in the through groove 7f enables a height of the melted first convex portion 8d pushed from the second primary surface to be reduced. When the through groove 7f is formed, the narrow width portion can be formed by using a cutting tool such as a grinder with two blades having a different width or with one blade having the same width until halfway toward a tip and a taper from halfway toward the tip.

The resin portion 8D includes the first convex portion 8d. The first convex portion 8d is formed according to a shape of the through groove 7f formed in the light-guiding plate 7D. The resin portion 8D has the opening 8a receiving the light source portion 1 and formed at prescribed intervals. The first convex portion 8d is continuously formed to rise vertically from a resin plane of the resin portion 8D according to the shape of the through groove 7f. Or else, the first convex portion 8d is formed to rise vertically from the resin plane having a sheet form according to the shape of the through groove 7f with the same width to surround the light source portion 1. The height of the first convex portion 8d can be formed equal to or more than that of the color adjustment layer 21 of the light source portion 1. The first convex portion 8d is formed higher than the color adjustment layer 21 to reflect upward a light which enters the light-guiding plate 7D from the light source portion 1. The resin 24 is filled in a through groove 7f above the first convex portion 8d, and this allows a kind of the resin to be changed, thereby improving an adjustment flexibility for the partitionability.

Figure 14A:
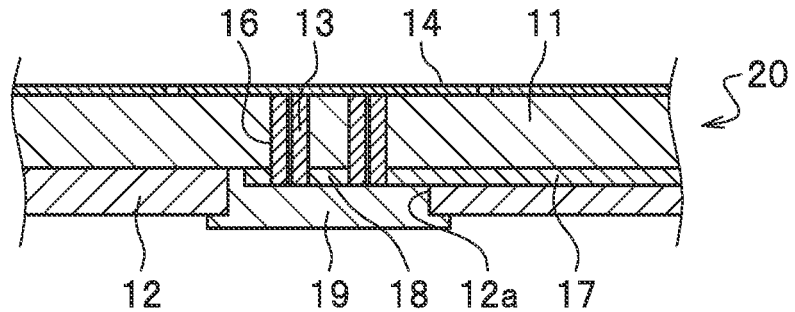
FIG. 14A is a cross-sectional view illustrating a wiring substrate in a method of manufacturing the surface-emitting light source according to the third embodiment.
Figure 14B:
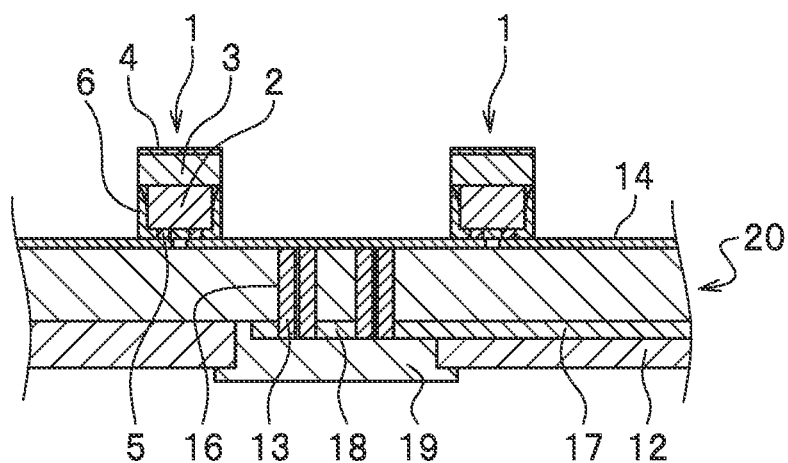
FIG. 14B is a cross-sectional view illustrating a configuration in which a light source portion is disposed on the wiring substrate in the method of manufacturing the surface-emitting light source according to the third embodiment.
Figure 14C:
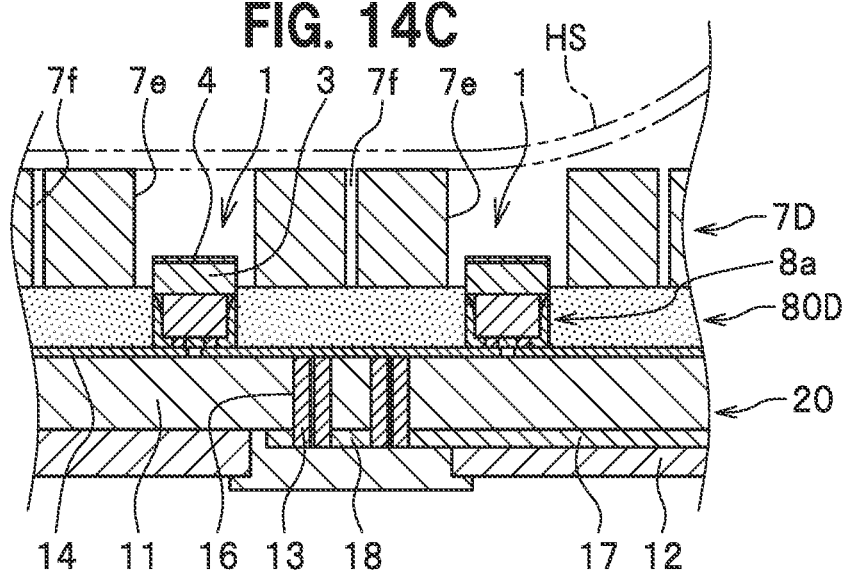
FIG. 14C is a cross-sectional view illustrating a configuration in which a light-guiding plate contacts a resin sheet in the method of manufacturing the surface-emitting light source according to the third embodiment.
Figure 14D:
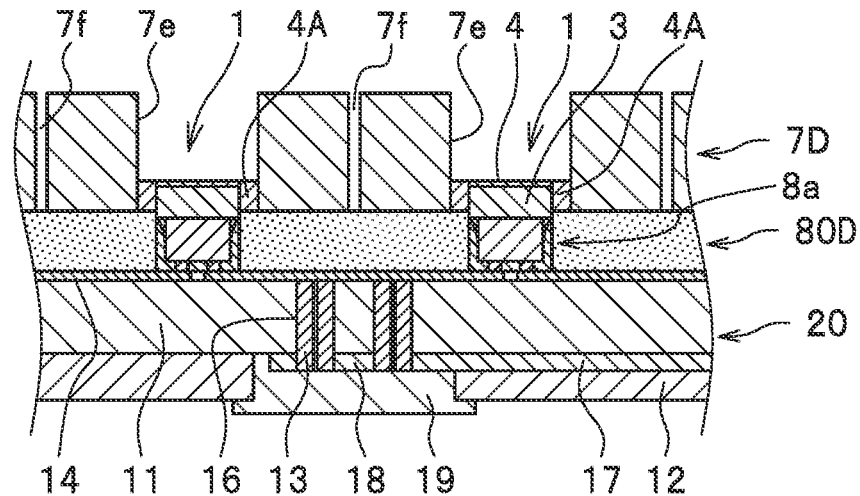
FIG. 14D is a cross-sectional view illustrating a configuration in which a bonding member is provided on the light source portion in the method of manufacturing the surface-emitting light source according to the third embodiment.
Figure 14E:
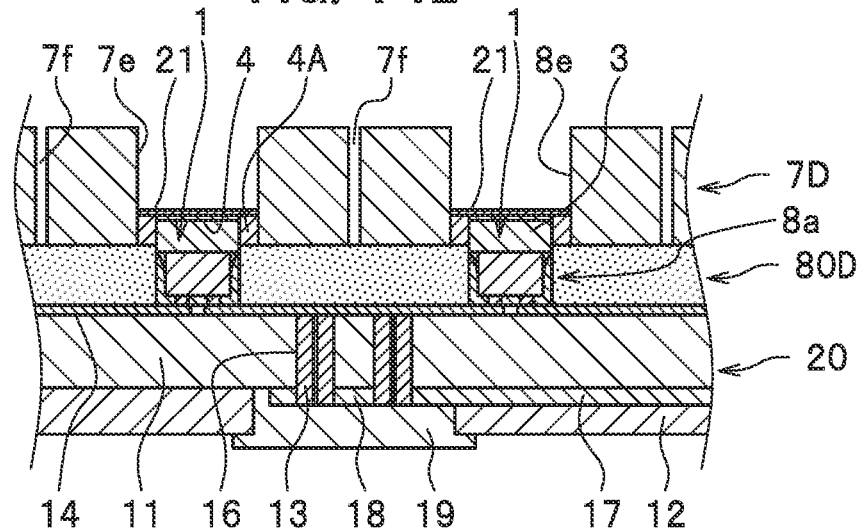
FIG. 14E is a cross-sectional view illustrating a configuration in which a color adjustment layer is provided in the method of manufacturing the surface-emitting light source according to the third embodiment.
Figure 14F:
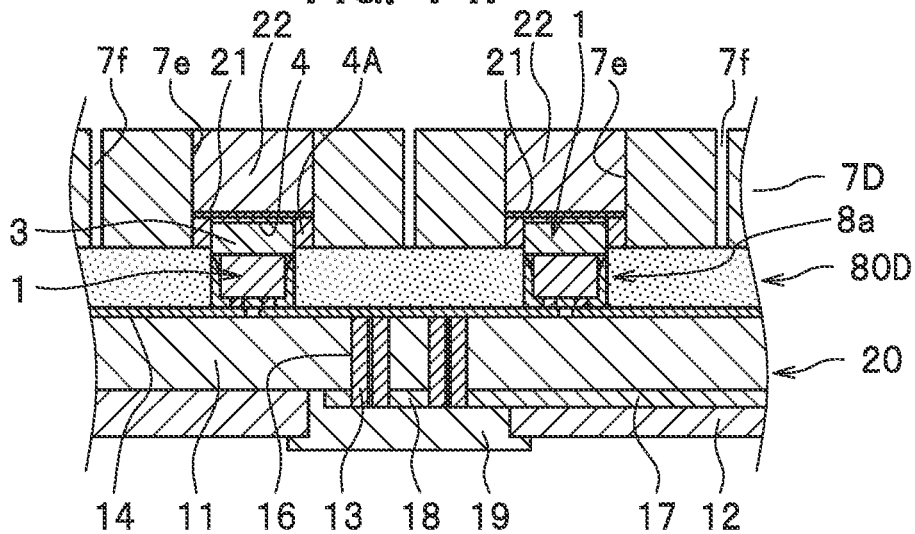
FIG. 14F is a cross-sectional view illustrating a configuration in which a sealing resin is provided in the method of manufacturing the surface-emitting light source according to the third embodiment.
Figure 14G:
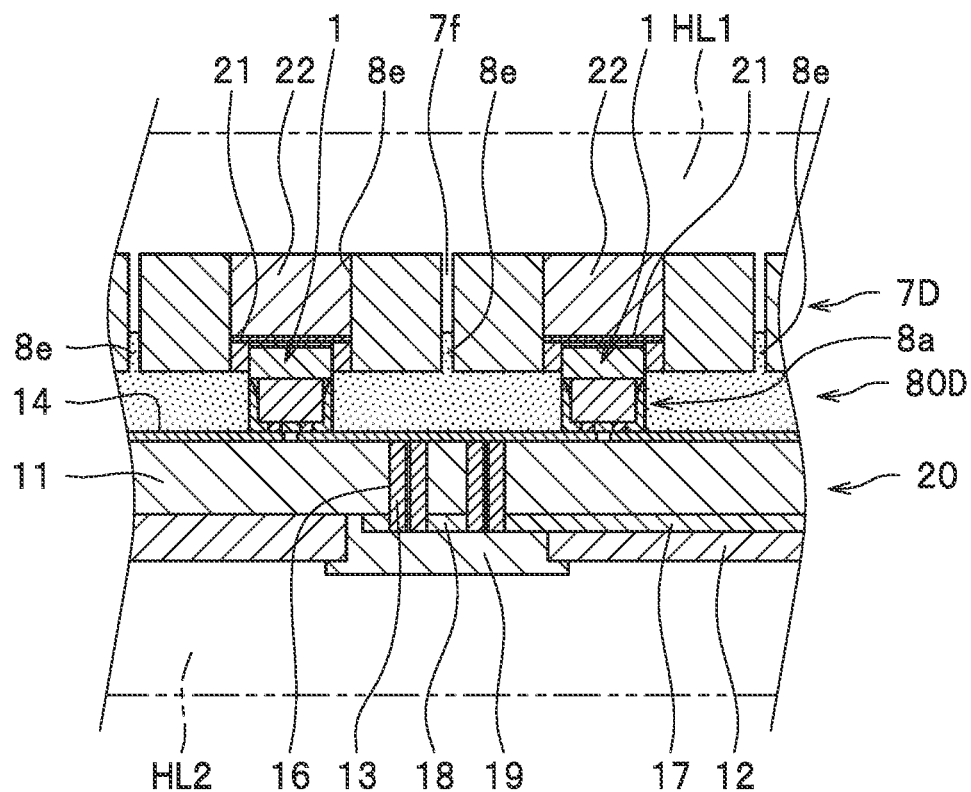
FIG. 14G is a cross-sectional view illustrating a process of pressing in the method of manufacturing the surface-emitting light source according to the third embodiment.
Figure 14H:
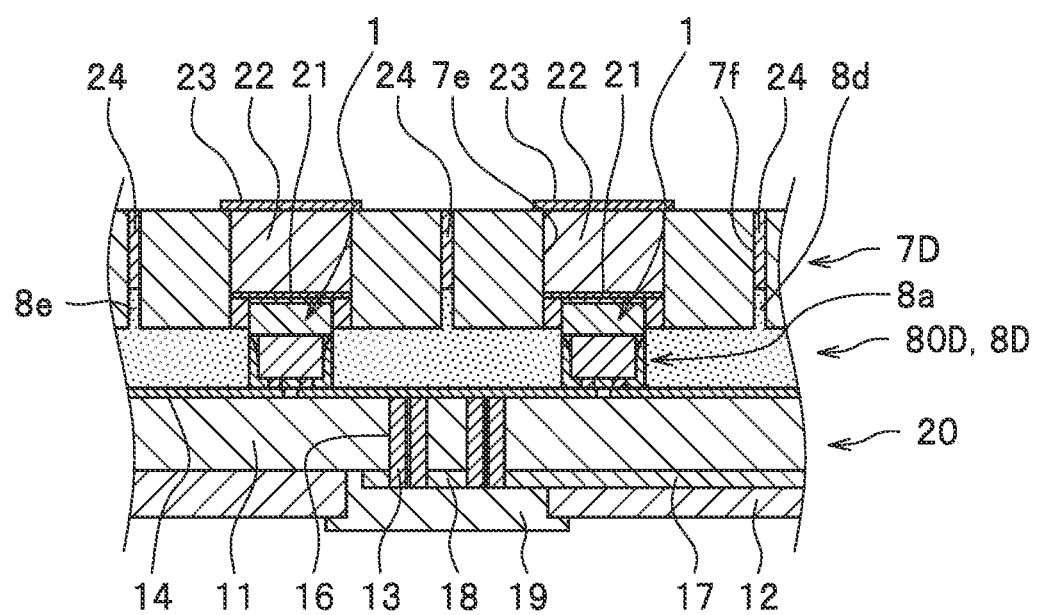
FIG. 14H is a cross-sectional view illustrating a configuration in which a light-blocking layer and a resin are provided in the method of manufacturing the surface-emitting light source according to the third embodiment.

Next, a method of manufacturing the surface-emitting light source 100D according to the third embodiment will be described with references to FIGS. 14A through 14H. FIG. 14A is a cross-sectional view illustrating a wiring substrate in a method of manufacturing the surface-emitting light source according to the third embodiment. FIG. 14B is a cross-sectional view illustrating a configuration in which a light source portion is disposed on the wiring substrate in the method of manufacturing the surface-emitting light source according to the third embodiment. FIG. 14C is a cross-sectional view illustrating a configuration in which a light-guiding plate contacts a resin sheet in the method of manufacturing the surface-emitting light source according to the third embodiment. FIG. 14D is a cross-sectional view illustrating a configuration in which a bonding member is provided on the light source portion in the method of manufacturing the surface-emitting light source according to the third embodiment. FIG. 14E is a cross-sectional view illustrating a configuration in which a color adjustment layer is provided in the method of manufacturing the surface-emitting light source according to the third embodiment. FIG. 14F is a cross-sectional view illustrating a configuration in which a sealing resin is provided in the method of manufacturing the surface-emitting light source according to the third embodiment. FIG. 14G is a cross-sectional view illustrating a process of pressing in the method of manufacturing the surface-emitting light source according to the third embodiment. FIG. 14H is a cross-sectional view illustrating a configuration in which a light-blocking layer and a resin are provided in the method of manufacturing the surface-emitting light source according to the third embodiment.

The method of manufacturing the surface-emitting light source 100D includes a process of preparing: the wiring substrate 20 having the light source portion 1 electrically connected to the wiring layer; the light-guiding plate 7D having the first primary surface and the second primary surface that is opposite to the first primary surface and has the receiving hole 7e (a through hole); and the light-reflective resin sheet 80D having the opening 8a with a size equal to or larger than the light source portion 1. The method of manufacturing the surface-emitting light source 100D further includes a process of bonding: the wiring substrate 20 and the resin sheet 80D to each other by bringing the resin sheet 80D into contact with the wiring substrate 20 and the light-guiding plate 7D into contact with the resin sheet 80D and heating the resin sheet 80D to melt a portion of the resin sheet 80D while a light-extracting surface of the light source portion 1 is exposed from the resin sheet 80D via the opening 80a of the resin sheet 80D; and further bonding the resin sheet 80D and the light-guiding plate 7D to each other after a melted portion of the resin sheet 80D enters the through hole 7f (a through groove).

As an example, the process of preparing includes a sub-process of preparing wiring substrate, a sub-process of preparing light source portion, a sub-process of preparing light-guiding plate and a sub-process of preparing resin sheet. These sub-processes are performed in no particular order. The sub-process of preparing wiring substrate includes: forming the first wiring layer 17 and the second wiring layer 14 on the base member 11; providing the conductive members 13 electrically connected to the first wiring layer 17 and the second wiring layer 14 via the via 16; and providing the wiring substrate 20 having the first covering layer 12 and the protection member 19 at the first wiring layer 17 side. The sub-process of preparing light source portion includes disposing a plurality of the light source portions 1 on the second wiring layer 14 of the wiring substrate 20 and connecting the element electrodes 5 of the light source portion 1 to the wiring layer 14 of the wiring substrate 20. The sub-process of preparing resin sheet includes providing the resin sheet 80D forming the opening 8a such that the light source portion 1 is inserted to the opening 8a. The sub-process of preparing light-guiding plate includes providing the light-guiding plate 7D such that the light-guiding plate 7D preliminarily having the receiving hole 7e and the through groove 7f is joined to a holding sheet HS, the top portion of the light source portion 1 is inserted to the receiving hole 7e with the holding sheet HS set above, and the resin sheet 80D contacts the light-guiding plate 7D.

Thereafter, the holding sheet HS is removed. In a process of providing bonding member, the bonding member 4A is provided around the tip of the light source portion 1. The bonding member 4A is provided to have a height substantially equal to the light-reflective film 4 being the tip of the light source portion 1. Next, in a process of providing color adjustment layer, the color adjustment layer 21 is provided on the upper surface of the bonding member 4A and the light-reflective film 4. The color adjustment layer 21 is formed according to the shape of the receiving hole 7e in a plan view. Next, in a process of providing sealing resin, the sealing resin 22 is filled in the receiving hole 7e above the color adjustment layer 21 and temporarily cured. The sealing resin 22 is filled to have a height substantially equal to the upper surface of the light-guiding plate 7D.

Next, the process of bonding is performed. The process of bonding, while the wiring substrate 20 is disposed on a board as a lower plate, is implemented to press the light-guiding plate 7D with an upper mold to bring the resin sheet 80D into contact with the wiring substrate 20 and to bring the light-guiding plate 7D into contact with the resin sheet 80D. The light-guiding plate 7D and the resin sheet 80D are bonded to each other and the resin sheet 80D and the wiring substrate 20 are bonded to each other by heating the upper plate alone or both the upper and lower plates. Further, the process of bonding is implemented to melt the upper surface of the resin sheet 80D by heating. A portion of the melted resin sheet 80D is pushed into the through groove 7f from a groove opening of the second primary surface of the light-guiding plate 7. Thus, a portion of the resin sheet 80D enters into the through groove 7f and is cured to form the resin portion 8D having the first convex portion 8d. In the process of bonding, a pressure is adjusted such that a height of the first convex portion 8d does not exceed that of the through groove 7f. The sealing resin 22 is made of a lower elastic material than the light-guiding plate 7D, and this makes it difficult to apply a pressure on the light source portion 1 during the pressing, thereby preventing the light source portion 1 from being damaged. The sealing resin 22 can be cured by heating during the pressing or temporarily cured by heating during the pressing then completely cured by additional heating.

Next, a process of injecting a resin and providing a light-blocking layer are performed. The through groove 7e is filled with the resin 24 from the first primary surface of the light-guiding plate 7D to seal the through groove 7e. The process of injecting the resin 24 to seal the through groove 7e is performed while the process of providing the light-blocking layer 23 is performed. Providing the light-blocking layer 23 and injecting the resin 24 are performed in no particular order or at the same time. The light-blocking layer 23 here is formed in a rectangle and arranged such that the four corners of the light-blocking layer 23 rotates at 45 degrees with respect to four corners of the light-reflective film 4 in a plan view. Such processes manufacture the surface-emitting light source 100D.

Figure 15:
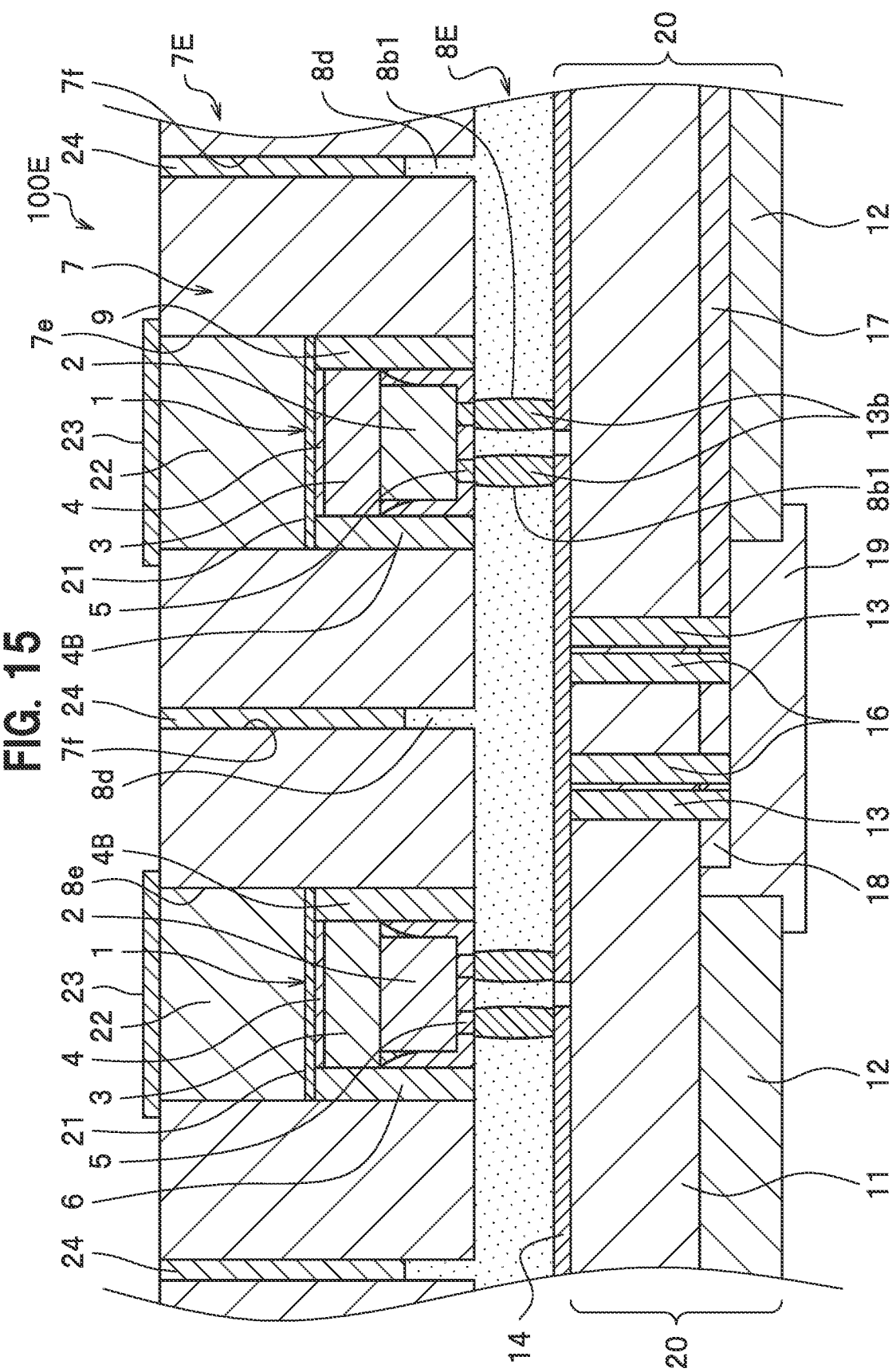
FIG. 15 is an enlarged cross-sectional view illustrating a part of a surface-emitting light source according to a fourth embodiment of the present disclosure.

A configuration of a surface-emitting light source according to a fourth embodiment will be described with reference to FIG. 15. FIG. 15 is an enlarged cross-sectional view illustrating a part of a surface-emitting light source according to a fourth embodiment. The fourth embodiment includes the first convex portion 8d and the light-guiding plate 7D in the third embodiment under the configuration of the resin portion 8B in the second embodiment. As to the same configuration members described above, the same reference numerals can be added, and the descriptions can be appropriately omitted. A surface-emitting light source 100E includes: a resin portion 8E including the via holes 8b1 having the conductive members 13b; and the first convex portion 8d. The via holes 8b1 and the conductive members 13b have the same configuration as that of the second embodiment described above. The first convex portion 8d has the same configuration as that of the third embodiment described above. The surface-emitting light source 100E will be described in which, for example, it is formed of 25 cells (per one unit), or five cells multiplied by five cells and a multi-unit configuration. A light-guiding plate 7E has the same configuration as that of the third embodiment described above except a depth of the receiving hole 7e and a depth of the through groove 7f. In the fourth embodiment, the receiving hole 7e has the depth capable of receiving the element electrodes 5 of the light source portion 1. The light-guiding plate 7E includes the sealing resin 22, the color adjustment layer 21, the light-reflective film 4, the first light-transmissive member 3, the covering member 6, the light-emitting element 2 and the bonding member 4B, which are disposed from the first primary surface to the receiving hole 7e. The element electrodes 5 of the light-emitting element 2 is disposed to connect to the conductive members 13b via the second primary surface.

Figure 16A:
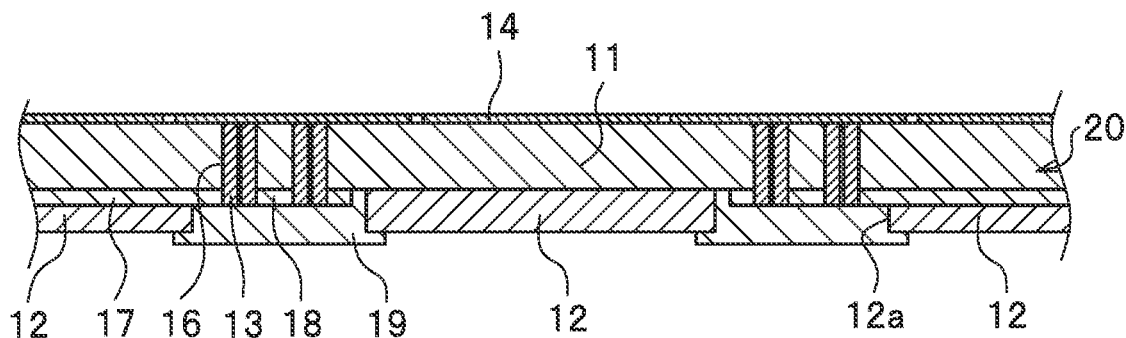
FIG. 16A is a cross-sectional view illustrating a wiring substrate prepared in a method of manufacturing the surface-emitting light source according to the fourth embodiment.
Figure 16B:
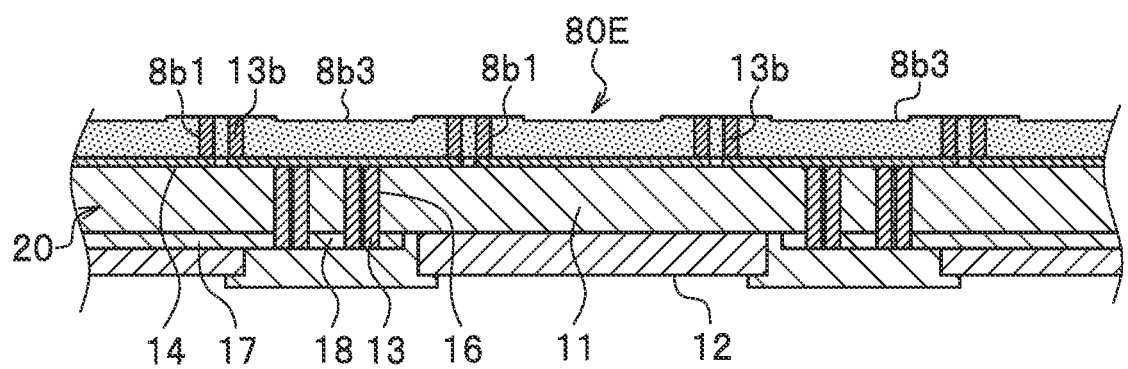
FIG. 16B is a cross-sectional view illustrating a configuration in which a resin sheet is disposed on the wiring substrate in the method of manufacturing the surface-emitting light source according to the fourth embodiment.
Figure 16C:
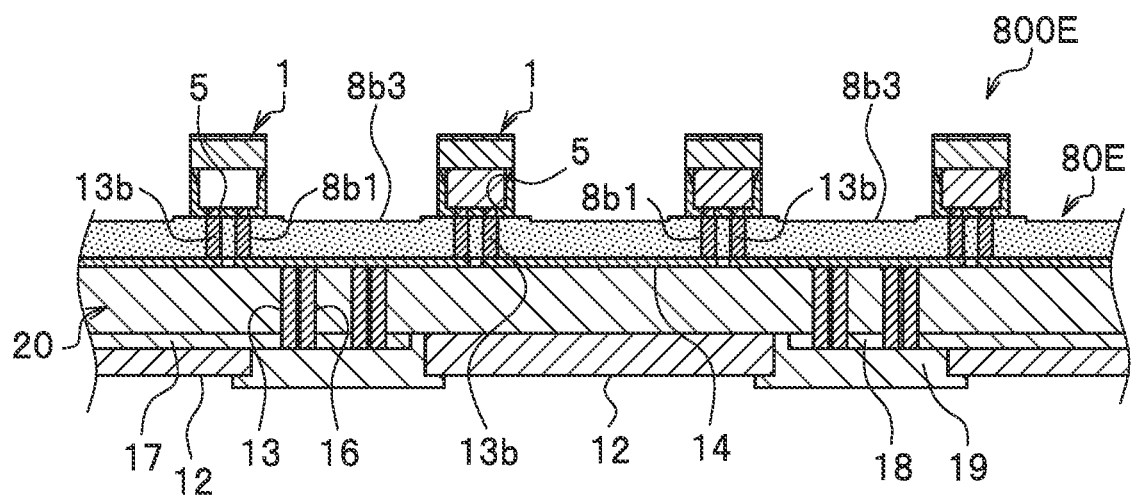
FIG. 16C is a cross-sectional view illustrating an intermediate which is prepared by using the method of manufacturing the surface-emitting light source according to the fourth embodiment.
Figure 16D:
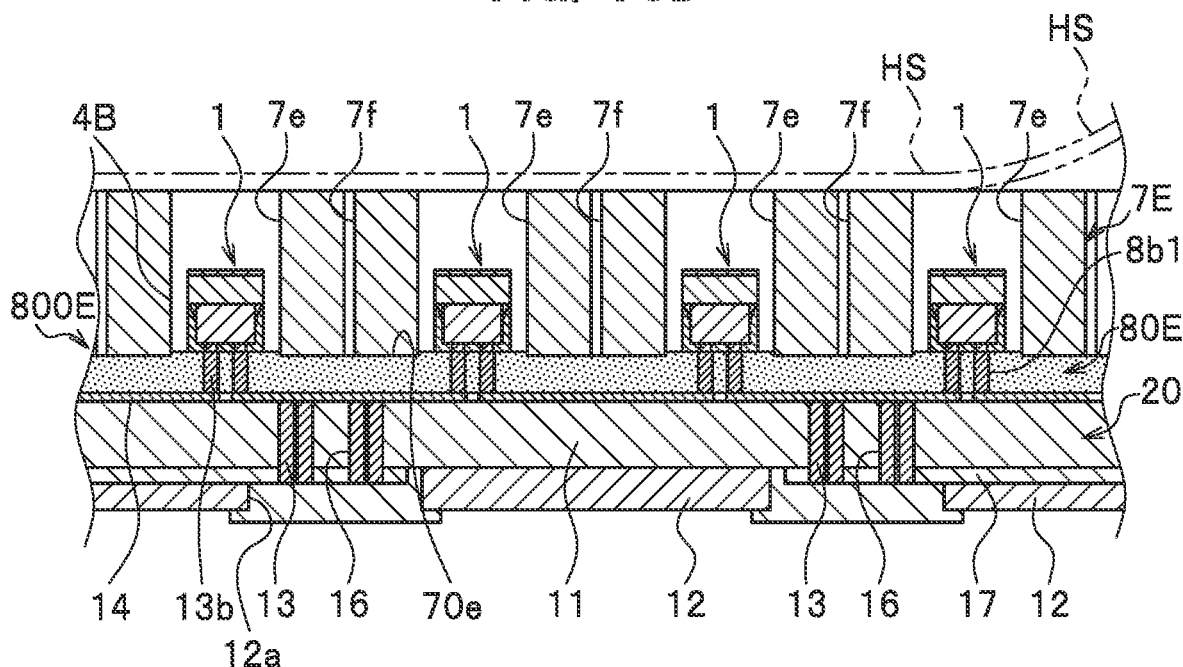
FIG. 16D is a cross-sectional view illustrating a configuration in which a light-guiding plate is disposed on the intermediate in the method of manufacturing the surface-emitting light source according to the fourth embodiment.
Figure 16E:
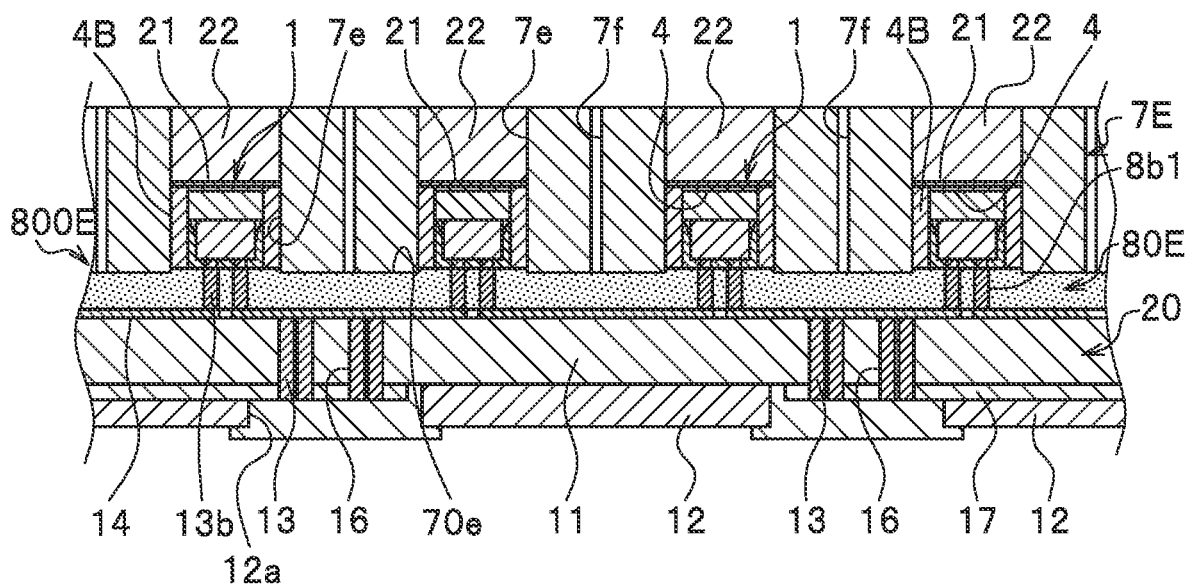
FIG. 16E is a cross-sectional view illustrating a configuration in which a light source portion is filled with a bonding member, and a color adjustment layer and a sealing resin are provided in the method of manufacturing the surface-emitting light source according to the fourth embodiment.

Next, a method of manufacturing the surface-emitting light source 100E according to the fourth embodiment will be described with references to FIGS. 16A through 16F. FIG. 16A is a cross-sectional view illustrating a wiring substrate prepared in a method of manufacturing the surface-emitting light source according to the fourth embodiment. FIG. 16B is a cross-sectional view illustrating a configuration in which a resin sheet is disposed on the wiring substrate in the method of manufacturing the surface-emitting light source according to the fourth embodiment. FIG. 16C is a cross-sectional view illustrating an intermediate which is prepared by using the method of manufacturing the surface-emitting light source according to the fourth embodiment. FIG. 16D is a cross-sectional view illustrating a configuration in which a light-guiding plate is disposed on the intermediate in the method of manufacturing the surface-emitting light source according to the fourth embodiment. FIG. 16E is a cross-sectional view illustrating a configuration in which a light source portion is filled with a bonding member, and a color adjustment layer and a sealing resin are provided in the method of manufacturing the surface-emitting light source according to the fourth embodiment. FIG. 16F is a cross-sectional view illustrating a process of bonding in the method of manufacturing the surface-emitting light source according to the fourth embodiment. The method of manufacturing the surface-emitting light source 100E includes a process of preparing: an intermediate 800E including the element electrodes 5 of the light source portion 1 electrically connected to the second wiring layer 14 of the wiring substrate 20 via the via holes as an opening of a resin sheet 80E in contact with the wiring substrate 20; and a light-guiding plate 7E. The method of manufacturing the surface-emitting light source 100E further includes a process of bonding: the wiring substrate 20 and the resin sheet 80E of the intermediate 800E to each other by bringing the resin sheet 80E into contact with the wiring substrate 20 and the light-guiding plate 7E into contact with the resin sheet 80E and heating the resin sheet 80E to melt a portion of the resin sheet 80E (front and rear surfaces); and further bonding the resin sheet 80E of the intermediate 800E and the light-guiding plate 7E to each other after a melted portion of the resin sheet 80E enters the receiving hole 7e.

The process of preparing includes, for example, a sub-process of preparing the wiring substrate 20, a sub-process of preparing the light source portion 1, a sub process of preparing the light-guiding plate 7E, a sub-process of preparing the resin sheet 80E and a sub-process of preparing the intermediate 800E. The sub-process of preparing the wiring substrate 20 has the same process as described above. The sub-process of preparing the light source portion 1 has the same process as described in the first embodiment. The sub-process of preparing the light-guiding plate 7E is implemented to prepare the light-guiding plate 7E including the receiving hole 8e and the through groove 7f. The sub-process of preparing the resin sheet 80E is implemented to form the via holes 8b1 as an opening and form the resin sheet 80E having the via holes 8b1 filled with the conductive members 13b. The sub-process of preparing the intermediate 800E is implemented to prepare the intermediate 800E such that the light source portion 1 is provided with an electrical connection between the conductive members 13b exposed to one end of the via holes 8b1 of the resin sheet 80E and the element electrodes 5 of the light source portion 1, and the resin sheet 80E contacts the wiring substrate 20. In the intermediate 800E, when the resin sheet 80E contacts the wiring substrate 20, the conductive members 13b exposed to the other end in the via holes 8b1 and prescribed positions of the second wiring layer 14 of the wiring substrate 20 are electrically to be connected.

In the process of bonding, the light-guiding plate 7E contacts the intermediate 800E such that the light source portion 1 on the intermediate 800E is received in the receiving hole 7e of the light-guiding plate 7E. The color adjustment layer 21 is disposed on the upper surface of the light-reflective film 4 and the bonding member 4B from the opening of the receiving hole 7e. Further, the sealing resin 22 is disposed on the upper surface of the color adjustment layer 21 and flush with the first primary surface of the light-guiding plate 7E such that the opening of the upper portion of the receiving hole 7e is closed. Thereafter, the pressing is performed with the sealing resin 22 heated. The sealing resin 22 is made of a lower elastic material than the light-guiding plate 7E, and this reduces a pressure on the light source portion 1 during the pressing, thereby improving a reliability of the light source portion 1. When the heating is performed during the pressing, the resin sheet 80E of the intermediate 800E and the light-guiding plate 7E face each other and are bonded to each other on their facing surfaces, and the resin sheet 80E of the intermediate 800E and the wiring substrate 20 face each other and are bonded to each other on their facing surfaces, with bonding layers which are melted portions of the front and rear surfaces of the resin sheet 80E. The first convex portion 8d is formed by filling the through groove 7f of the light-guiding plate 7E with a portion of the melted resin sheet 80E while the resin sheet 80E and the light-guiding plate 7E are pressed against each other. The resin sheet 80E is bonded to the light-guiding plate 7E and the wiring substrate 20, and then cured to form the resin portion 8E having the first convex portion 8d. The receiving hole 7e of the light-guiding plate 7E receives the light source portion 1 via the bonding member 4B. The element electrodes 5 of the light source portion 1 and the conductive members 13b of the resin sheet 80E are bonded to each other, and the light-guiding plate 7E comes into contact with the resin sheet 80E.

The pressing in the process of bonding is implemented to bond the light-guiding plate 7E and resin sheet 80E to each other and the resin sheet 80E and the wiring substrate 20 to each other by pressing them while they are heated. In the pressing, the heated front and rear surfaces of the resin sheet 80E are melted to be adhesive layers. The light-guiding plate 7E and the resin sheet 80E are bonded to each other via the adhesive layer and the resin sheet 80E and the wiring substrate 20 are bonded to each other via the adhesive layer. The melted portions of the front and rear surfaces of the resin sheet 80E are pressed to be filled in the groove 7f of the light-guiding plate 7E, thereby forming the first convex portion 8d. At this time, when resin sheet 80E is formed with the step portion 8b3 on the one side thereof, a portion of the melted resin is easily collected and the first convex portion 8d is easily formed. As being pressed, the resin sheet 80E and the light-guiding plate 7E are bonded without any gap and the resin sheet 80E and the wiring substrate 20 are bonded without gap therebetween. While the light-guiding plate 7E and the resin sheet 80E are bonded to each other and the resin sheet 80E and wiring substrate 20 are bonded to each other when the resin sheet 80E is heated, the resin sheet 80E is melted and the melted resin can enter the through groove 7f without particular being pressed. Adjustment of degree of the pressing between the light-guiding plate 7E and the wiring substrate 20 allows a height of the resin filled in the through groove 7f to be adjusted, thereby resulting in adjustment of a height of the first convex portion 8d.

In the surface-emitting light source 100E, the resin sheet 80E is cured to form the resin portion 8E having the first convex portion 8d. When the pressing is performed, the pressing and the heating cause the via holes 8b1 and the conductive members 13b formed in the resin sheet 80E to be deformed from a straight tubular shape into a barrel shape having a central portion larger than top and bottom portions. However, this does not matter for electrical connection. After completion of the process of bonding, the through groove 7f of the light-guiding plate 7E is filled with the resin 24 for sealing, and the light-blocking layer 23 is disposed to cover the upper surface of the sealing resin 22, thereby forming the surface-emitting light source 100E. In the surface-emitting light source 100E, the light-blocking layer 23 and the light-reflective film 4 are arranged such that the respective corners of the rectangular light-blocking layer 23 and the respective corners of the rectangular light-reflective film 4 make 45 degrees therebetween in a plan view.

Modification

Figure 17A:
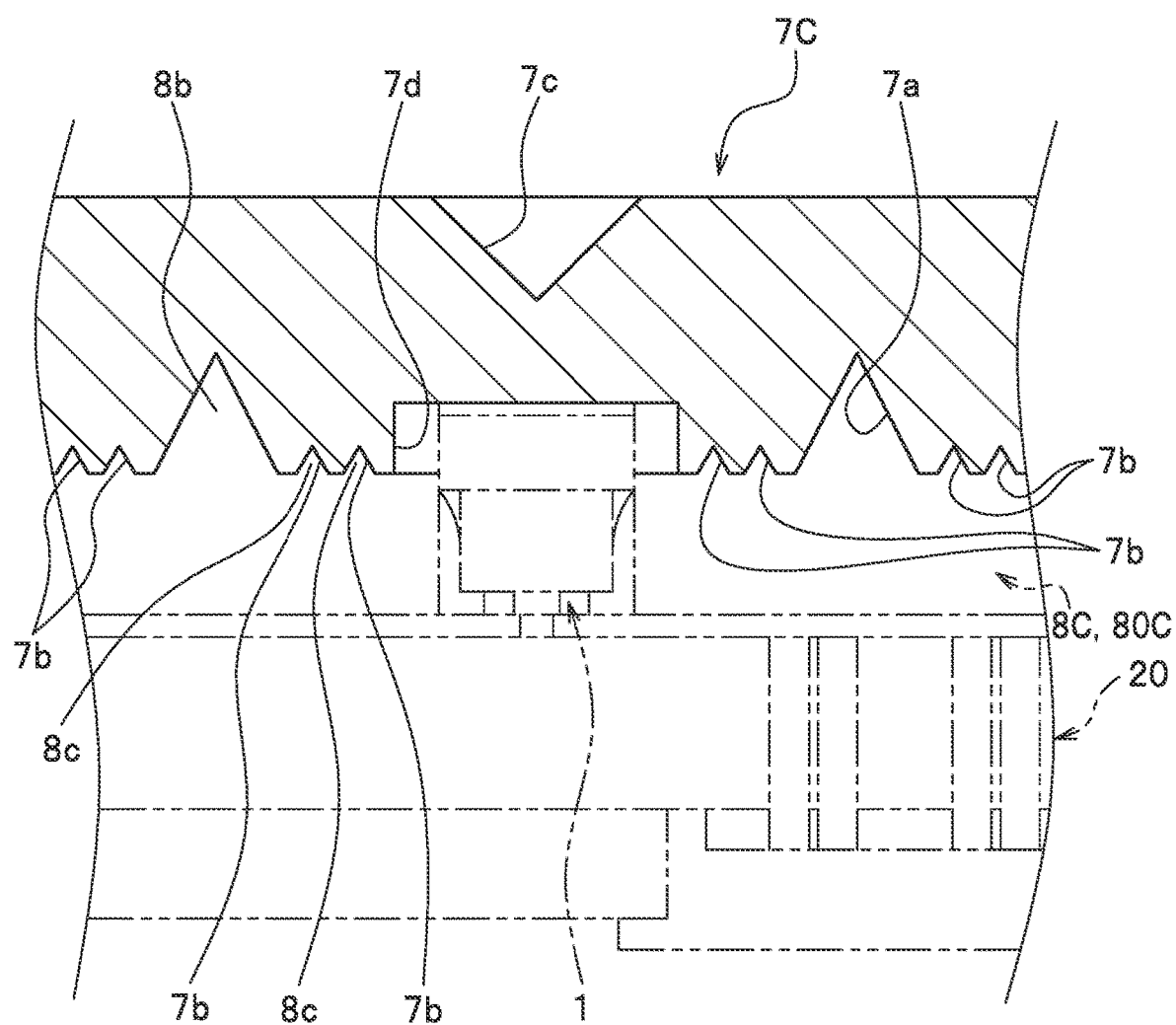
FIG. 17A is a cross-sectional view schematically illustrating a modification of the light-guiding plate according to each embodiment of the present disclosure.
Figure 17B:
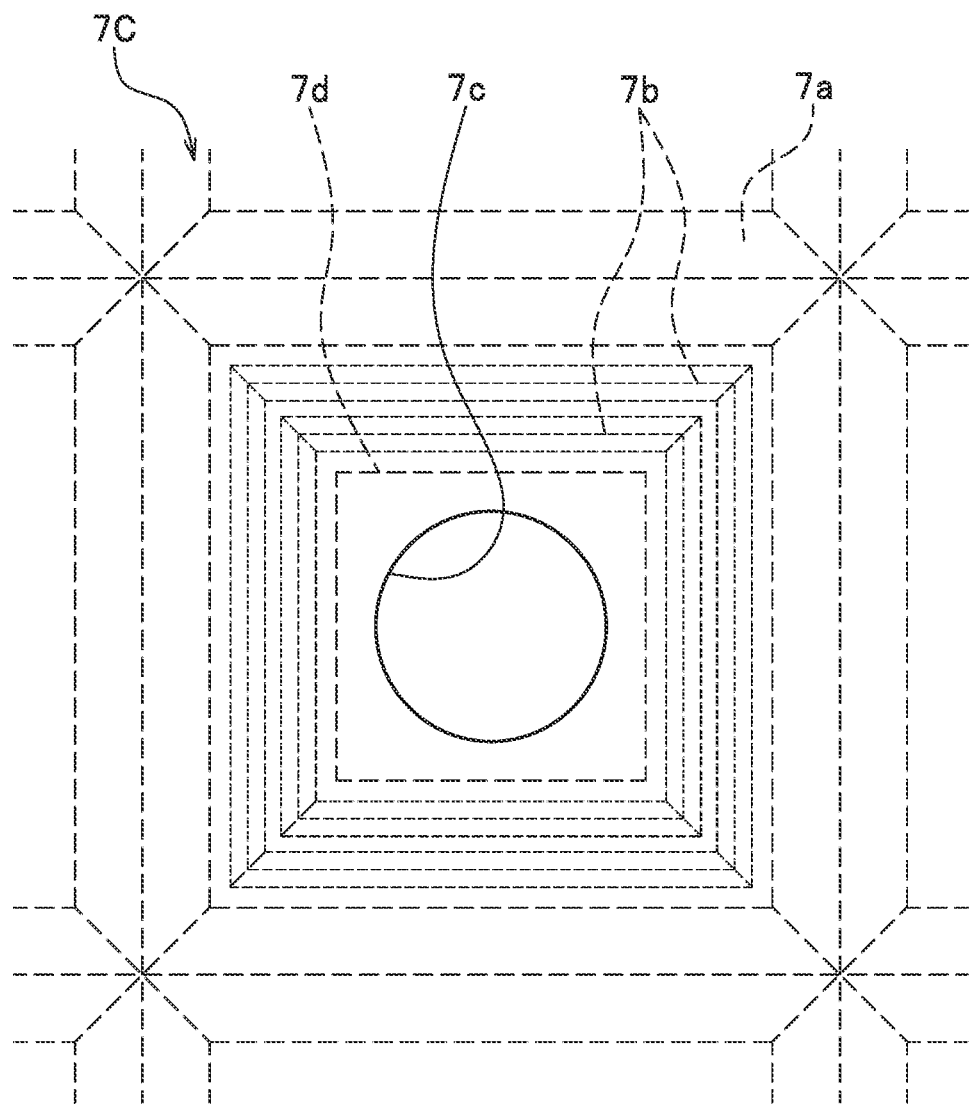
FIG. 17B is a plan view schematically illustrating a cell of the surface-emitting light source in the plan view in FIG. 17A.

A modification of a surface-emitting light source will be described with reference to FIGS. 17A and 17B. FIG. 17A is a cross-sectional view schematically illustrating a modification of the light-guiding plate according to each embodiment. FIG. 17B is a plan view schematically illustrating a cell of the surface-emitting light source in the plan view of FIG. 17A. As to the same configuration or the same method of manufacturing described above, the same reference numerals can be added, and the descriptions can be appropriately omitted. The surface-emitting light source 100C will be described as the configuration of the resin portion 8A, however, can be described as the configuration of the resin portion 8B. That is, the surface-emitting light source 100C can form a second recess portion 7b in the light-guiding plate 7C. This is a difference from the respective embodiments.

The second recess portion 7b can be formed, for example, to face a resin portion 8C between the neighboring first recess portions 7a. In particular, the second recess portion 7b has a triangular through groove in a cross-sectional view, which is formed between the first recess portion 7a and the optical function portion 7c to surround the optical function portion 7c. The second recess portions 7b are formed to surround double the optical function portion 7c in a rectangle. The second recess portion 7b has a bottom portion lower than the first recess portion 7a. The bottom portion of the second recess portion 7b is formed such that the second recess portion 7b has a smaller depth than the receiving recess portion 7d. The second recess portion 7b reflects the light from the light source portion 1 toward the first primary surface which is the upper surface of the light-guiding plate 7C.

In the surface-emitting light source 100C, the resin portion 8C includes a second convex portion 8c with a shape corresponding to the shape of the second recess portion 7b at a position where the second recess portion 7b faces. The second convex portion 8c has a shape and a position which are correspond to the shape and the position of the second recess portion 7b. The second convex portion 8c has a triangular convex shape in a cross-section and surrounds the light source portion 1 in a rectangle in a plan view. The second convex portions 8c are formed inside the first recess portion 8b in a certain distance therebetween in double. The second recess portion 7b and the resin portion 8C are formed between the first recess portions 7a and the first recess portion 8b, and thus the surface emitting light extracted from the light-guiding plate 7C becomes homogeneous. In the surface-emitting light source 100C, the light-guiding plate 7C is manufactured with the method of manufacturing described above. That is, in the process of bonding S12 and S22, the front and rear surfaces of the resin sheet 80C are melted to bond the resin sheet 80C and the light-guiding plate 7C to each other and the resin sheet 80C and the wiring substrate 20 to each other by pressing and heating. The light-guiding plate 7C has the first recess portion 7a and the second recess portion 7b which are filled with a portion of the melted resin sheet 80C to form the first convex portion 8b and the second convex portion 8c.

As described above, the surface-emitting light sources and the method of manufacturing the same employ preformed resin sheet in the resin portion, thereby preventing the resin portion from occurrence of a sink different from a resin formed by curing a melted liquid resin. The resin sheet has the front and rear surfaces, a portion of which are melted and form the adhesive layer and are bonded to the wiring substrate and the light-guiding plate via the adhesive layer. The first convex portion and the second convex portion are formed with a portion of the melted resin sheet, thereby being formed regardless of accuracy of a shape or a position of the first recess portion and second recess portion of the light-guiding plate. The light-guiding plate can include a plurality of the optical function portions per a segment. The light-guiding plate can also include a through hole which is capable of receiving the light source portion 1 and extends between the first primary surface and the second primary surface.

Further, the wiring opening portions 12a of the first covering layer 12 formed on the wiring pad 18 are not limited in shape and number and to, for example, a rectangle, an oval, a triangle, a cross or a hexagon. The resin portion includes the adhesive layer obtained by melting the front and rear surfaces of the resin sheet, meanwhile, the adhesive layer can be obtained by providing an additional light-transmissive bonding member to bond. The adhesive layer contains a material which bonds the light-guiding plate or the wiring substrate to another member. The adhesive layer can be made of a low elastic material to prevent the surface-emitting light source from bending caused by difference of linear coefficient of expansion between the light-guiding plate and the base member. An example of the adhesive layer is a low elastic material with a sheet shape, such as an acrylic-based resin, a silicon-based resin, a urethane-based resin. A thickness of the adhesive layer is required to have a capability of absorbing steps between the first wiring layer 17 and the second wiring layer 14 on the wiring substrate 20. The adhesive layer can have a thickness which is two or more times larger than that of the first wiring layer 17 or the second wiring layer 14, and four or more times are excellent.

The second wiring layer 14 can be formed to be covered with a second covering layer. When the second covering layer covers the second wiring layer 14, a wiring opening portion can be formed at a prescribed portion on the second covering layer so that an element electrode and a wiring are electrically connected. In the process of preparing wiring substrate, the process of forming the protection member 19 can be performed after the process of bonding. In the process of forming the protection member 19, the protection member 19 is formed from an upper end of the conductive members 13 pressed at the wiring opening portion 12a of the first covering layer 12 on the rear surface of the wiring substrate 20 bonded in the process S12 or S22. The process of forming the protection member 19 is implemented to provide and press the protection member 19 as an insulating resin from one surface of the base member 11 to cover the wiring pad 18. The protection member 19 has a height larger than that of the first covering layer 12 to cover the conductive members 13. When the via holes are not completely filled with the conductive members 13 and a gap remains, the protection member 19 is filled in the gap.

In the process S21, the resin sheet 80B can have an opening which has a size to surround and contact the light source portion 1 and extends through the resin sheet 80B in the thickness direction. With this configuration, the element electrodes 5 of the light source portion 1 can be connected to the second wiring layer 14 of the wiring substrate 20 via the opening and electrically connected to the first wiring layer 17 via the conductive members. In the process S21, the resin sheet 80B can have through holes extending through the resin sheet 80B in the thickness direction. The through holes are formed to correspond to the element electrodes 5 and have sizes to contact the side surface of the conductive members 13b. The element electrodes 5 of the light source portion 1 are electrically connected to the second wiring layer 14 of the wiring substrate 20 of the intermediate 800 via the through holes.

In the configuration shown in FIG. 13 or 15, a second recess portion can be formed from the through groove 7f toward the light source portion 1 at regular intervals and a second convex portion can be formed according to the second recess portion. A cross-section of the second convex portion can have a rectangle or a triangle shown in FIG. 17A.

Figure 18A:
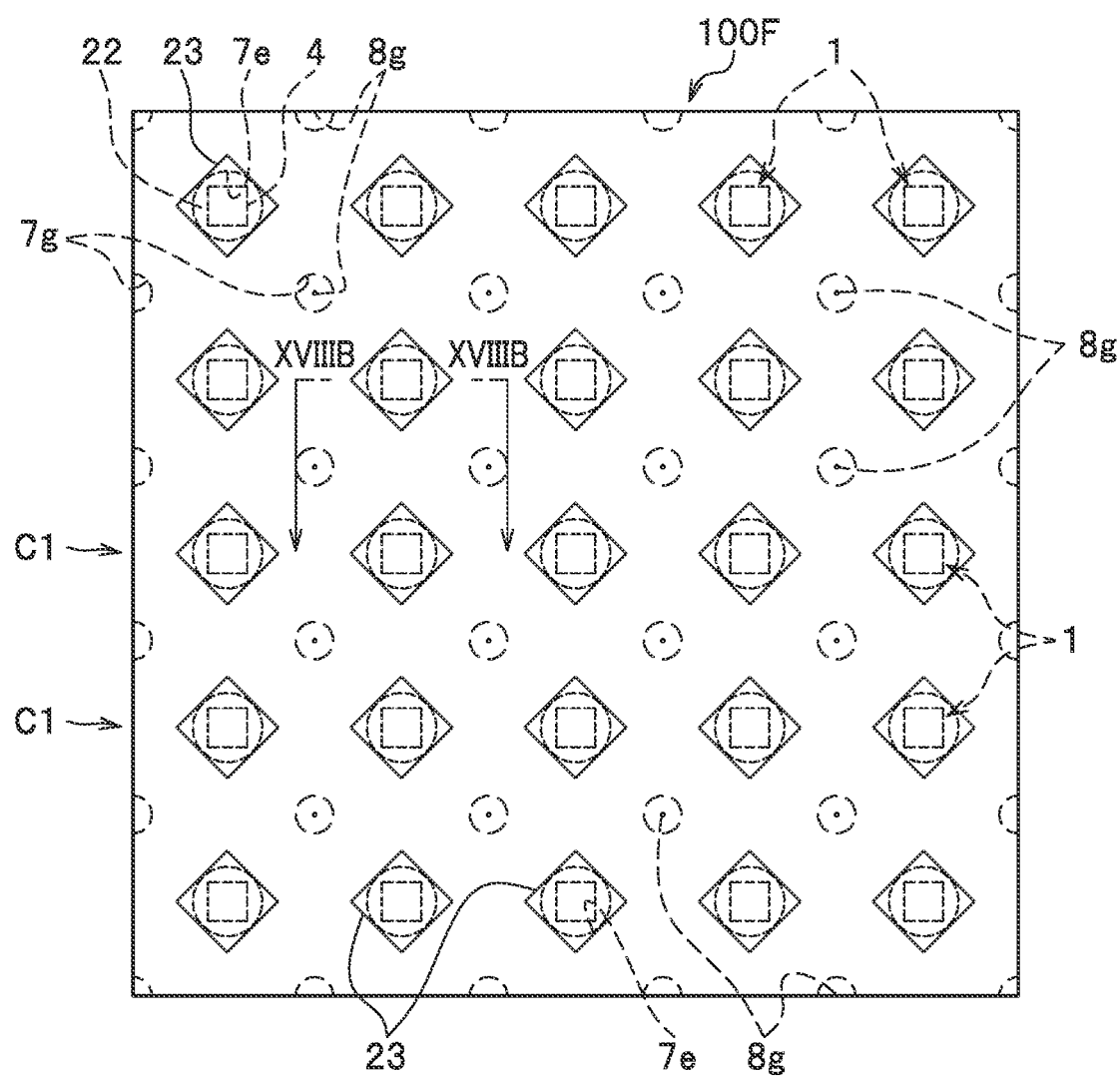
FIG. 18A is a plan view schematically illustrating an exemplary application according to an embodiment.
Figure 18B:
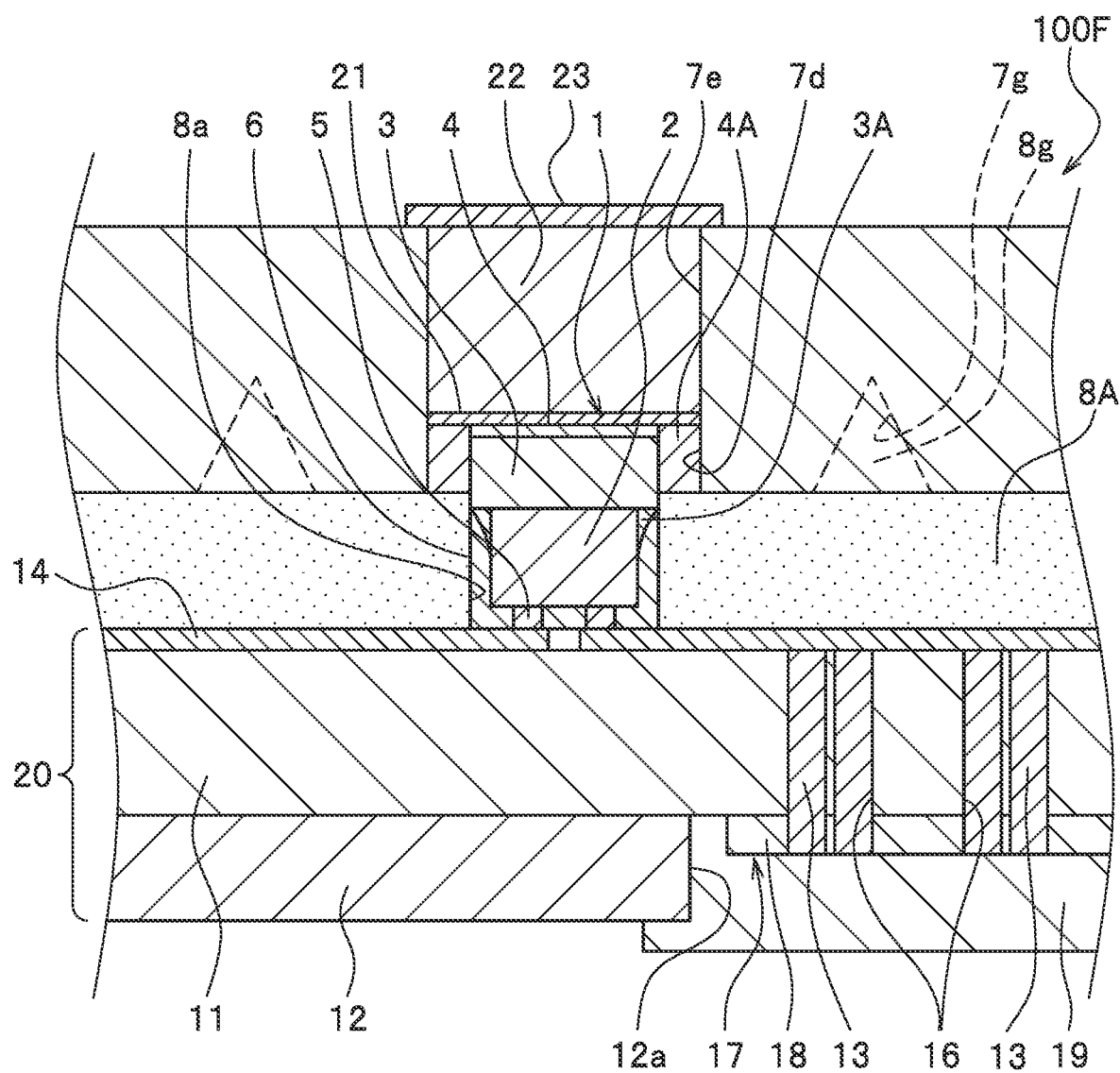
FIG. 18B is a schematic cross-sectional view taken along XVIIIB-XVIIIB in FIG. 18A.

In the third and fourth embodiments, the light-guiding plates 7D and 7E are described such that the receiving hole 7e extending through the light-guiding plates 7d or 7E and the through groove 7f are provided. Meanwhile, the receiving hole 7e can be provided combined with the configuration of the first and second embodiments. The receiving recess portion (the third recess portion) of the first and second embodiments can be combined with the through hole 7f (the through groove) of the third and fourth embodiments. Further, the configuration of the through hole formed in the light-guiding plate is described as an example such that the through hole is continuously provided within a range of the rectangular light source portion 1 as one cell. As shown in FIGS. 18A and 18B, for example, first convex portions 8g can be provided at four vertices of the rectangular cell. That is, the through hole or recess portion 7g can be formed so that the first convex portions 8g are provided at the four vertices of the cell respectively. When the recess portion 7g or the through hole is provided to correspond to the four vertices of the cell, the recess portion 7g or the through hole is formed to have a shape such as a circular cone, a cylinder and a cuboid. A height of the first convex portion 8g can be smaller than the thickness of the light-guiding plate and is equal to the height of the upper surface of the light source portion 1 or can be equal to the thickness of the light-guiding plate.

As described above, the surface-emitting light source can have various modifications on the basis of claims. In the method of manufacturing the surface-emitting light source, an additional process can be implemented between each process and before or after the whole process.

What is claimed is:

1. A surface-emitting light source comprising:
   a wiring substrate including a wiring layer on a base member;
   a light-guiding plate having a first primary surface and a second primary surface that is opposite to the first primary surface and faces the wiring substrate;
   a resin portion having a light-reflectivity having an opening and disposed between the light-guiding plate and the wiring substrate; and
   a light source portion having a first surface and a second surface opposite to each other and including an element electrode on the first surface and a light-extracting surface on the second surface,
   wherein the resin portion includes at least a thermoplastic resin,
   wherein in the light source portion the element electrode and the wiring layer are connected to each other via the opening of the resin portion,
   wherein the light source portion has a side surface having an area contacting the resin portion,
   the opening has a size equal to or smaller than the area,
   the light-extracting surface of the light source portion is provided to face the light-guiding plate,
   the resin portion and the light-guiding plate face each other and are bonded to each other, and
   the resin portion and the wiring substrate face each other and are bonded to each other.

2. A surface-emitting light source comprising:
   a wiring substrate including a wiring layer on a base member;
   a light-guiding plate having a first primary surface and a second primary surface that is opposite to the first primary surface, faces the wiring substrate and includes a recess portion or a through hole;
   a resin portion having a light-reflectivity filled in the recess portion or the through hole and disposed between the light-guiding plate and the wiring substrate;
   a light source portion having a first surface and a second surface opposite to each other and including an element electrode on the first surface and a light-extracting surface on the second surface; and
   a conductive member electrically connecting the element electrode and the wiring layer,
   wherein the resin portion includes at least a thermoplastic resin,
   wherein the resin portion contacts the light source portion or the conductive member,
   the resin portion and the light-guiding plate face each other and are bonded to each other, and
   the resin portion and the wiring substrate face each other and are bonded to each other.

3. The surface-emitting light source according to claim 1, wherein the wiring substrate has a surface facing the second primary surface of the light-guiding plate, wherein the second primary surface of the light-guiding plate and the surface of the wiring substrate are substantially parallel to each other.

4. The surface-emitting light source according to claim 1, wherein the light source portion include:
   a light-emitting element,
   a first light-transmissive member disposed on the light-emitting element, and
   a light-reflective member provided on a lower side of the first light-transmissive member and a lateral side of the light-emitting element.

5. The surface-emitting light source according to claim 4, wherein the first light-transmissive member contains a wavelength conversion material.

6. The surface-emitting light source according to claim 1, wherein a first portion of the resin portion is provided between the light source portion and the wiring substrate,
   wherein a second portion of the resin portion is provided between the light-guiding plate and the wiring substrate,
   wherein the first portion is continuous with the second portion.

7. The surface-emitting light source according to claim 1, wherein the resin portion includes an opening which extends through the resin portion in a thickness direction of the resin portion and has a size to surround and contact a side surface of the light source portion.

8. The surface-emitting light source according to claim 2, wherein the resin portion includes an opening which extends through the resin portion in a thickness direction of the resin portion, and
   wherein the resin portion contacts a side surface of a conductive member formed to correspond to the element electrode.

9. The surface-emitting light source according to claim 1, wherein a plurality of light source portions are arranged on the light-guiding plate,
   wherein the light-guiding plate includes a first recess portion between neighboring light source portions,
   the resin portion includes a first convex portion received in the first recess portion, and
   the first convex portion is configured to reflect a light from the light source portion to an upper surface of the light-guiding plate.

10. The surface-emitting light source according to claim 9, wherein a raw material for the resin portion forming the first convex portion is melted and filled in the first recess portion before the raw material for the resin portion is cured.

11. The surface-emitting light source according to claim 9,
    wherein the light-guiding plate includes a second recess portion positioned to face the resin portion between neighboring first recess portions,
    wherein the resin portion includes a second convex portion positioned to face the second recess portion, and
    wherein the second convex portion corresponds in shape to the second recess portion.

12. The surface-emitting light source according to claim 1,
wherein the light-guiding plate has a third recess portion closer to the resin portion, and
wherein the light source portion is disposed in the third recess portion.

13. The surface-emitting light source according to claim 12,
wherein the light-guiding plate has an upper surface opposed to the third recess portion,
wherein the light-guiding plate further includes a fourth recess portion closer to the upper surface than the third recess portion, and
wherein the fourth recess portion is configured to diffuse a light from the light source portion and the resin portion.

14. The surface-emitting light source according to claim 1,
wherein the wiring substrate includes a covering layer covering the wiring layer, and the covering layer includes a wiring opening portion which allows the element electrode to electrically connect to an external power source.

15. The surface-emitting light source according to claim 2,
wherein the through hole is a receiving hole in which a whole or part of the light source portion is disposed, or
wherein the through hole is a through groove receiving a first convex portion disposed between neighboring receiving holes.

16. The surface-emitting light source according to claim 4, wherein the first light-transmissive member has an upper surface on which a light-reflective film is formed.

17. The surface-emitting light source according to claim 1, wherein a light-reflective film or an optical function portion is provided on the first primary surface of the light-guiding plate above the light source portion.

18. A method of manufacturing a surface-emitting light source comprising: preparing: a wiring substrate including a light source portion electrically connected to a wiring layer;
a light-guiding plate having a first primary surface and a second primary surface that is opposite to the first primary surface and includes a recess portion or a through hole; and
a resin sheet having a light-reflectivity and including an opening having a size equal to or larger than the light source portion; and
bonding: the wiring substrate and the resin sheet to each other by bringing the resin sheet into contact with the wiring substrate and the light-guiding plate into contact with the resin sheet and heating the resin sheet to melt a portion of the resin sheet while a light-extracting surface of the light source portion is exposed from the resin sheet via the opening of the resin sheet; and
further bonding the resin sheet and the light-guiding plate to each other after a melted portion of the resin sheet enters the recess portion or the through hole.

19. A method of manufacturing a surface-emitting light source comprising preparing: an intermediate electrically connecting element electrodes of a light source portion to a wiring layer of a wiring substrate via an opening of a resin sheet in contact with the wiring substrate; and
a light-guiding plate having a first primary surface and second primary surface opposite to each other and including a recess portion or a through hole; and
bonding: the wiring substrate and the resin sheet to each other by bringing the resin sheet into contact with the wiring substrate and heating the resin sheet to melt a portion of the resin sheet; and
further bonding the resin sheet and the light-guiding plate to each other after a melted portion of the resin sheet enters the recess portion or the through hole.

20. The method of manufacturing the surface-emitting light source according to claim 18, wherein, in the preparing, an element electrode of the light source portion is electrically connected to the wiring layer of the wiring substrate.

21. The method of manufacturing the surface-emitting light source according to claim 18, wherein, in the preparing, the light-guiding plate is formed with a first recess portion between neighboring light source portions, and
wherein, in the bonding, the resin sheet is formed with a first convex portion by filling the first recess portion with the melted portion of the resin sheet.

22. The method of manufacturing the surface-emitting light source according to claim 21, wherein, in the preparing, the light-guiding plate is formed with a second recess portion that is disposed between neighboring first recess portions and faces the resin sheet, and wherein, in the bonding, the second recess portion is filled with the melted portion of the resin sheet to form the second convex portion.

23. The method of manufacturing the surface-emitting light source according to claim 18, wherein, in the preparing, the light-guiding plate is formed with a third recess portion which is disposed closer to a lower surface of the light-guiding plate opposed to the light-extracting surface of the light source portion and in which the light source portion is disposed, and
in the bonding, the first light-transmissive member is bonded to the third recess portion of the light-guiding plate while being disposed on the light-extracting surface of the light source portion.

* * * * *